United States Patent
Fukasawa

(10) Patent No.: US 7,904,227 B2
(45) Date of Patent: Mar. 8, 2011

(54) ELECTRIC PARKING BRAKE SYSTEM AND METHOD FOR CONTROLLING THE ELECTRIC PARKING BRAKE SYSTEM

(75) Inventor: Tsukasa Fukasawa, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 173 days.

(21) Appl. No.: 11/855,742

(22) Filed: Sep. 14, 2007

(65) Prior Publication Data

US 2008/0071458 A1 Mar. 20, 2008

(30) Foreign Application Priority Data

Sep. 15, 2006 (JP) .................. 2006-251804

(51) Int. Cl.
*G06F 7/70* (2006.01)
*F16D 55/08* (2006.01)
*F16H 61/26* (2006.01)

(52) U.S. Cl. ............................ 701/70; 188/72.1; 477/127

(58) Field of Classification Search .................... 701/70, 701/93; 188/79.54–79.59; 192/219.4–220, 192/222; 318/400.13–400.14; 180/65.1–65.8; 903/906, 914, 917; 477/127, 132, 78, 64

See application file for complete search history.

(56) References Cited

U.S. PATENT DOCUMENTS

| | | | | |
|---|---|---|---|---|
| 6,139,117 A * | 10/2000 | Shirai et al. | | 303/3 |
| 6,397,981 B1 * | 6/2002 | Tamasho et al. | | 188/71.9 |
| 2004/0016612 A1 * | 1/2004 | Iwagawa et al. | | 188/265 |
| 2004/0113486 A1 * | 6/2004 | Koga et al. | | 303/20 |
| 2004/0215385 A1 * | 10/2004 | Aizawa et al. | | 701/93 |

FOREIGN PATENT DOCUMENTS

| | | |
|---|---|---|
| DE | 41 29 919 A1 | 3/1993 |
| EP | 1 657 120 A1 | 5/2006 |
| JP | 7-144623 | 6/1995 |
| JP | 2003-327101 | 11/2003 |
| JP | 2006-137218 | 6/2006 |
| JP | 2006-200716 | 8/2006 |

* cited by examiner

*Primary Examiner* — Jack Keith
*Assistant Examiner* — Muhammad Shafi
(74) *Attorney, Agent, or Firm* — Oblon, Spivak, McClelland, Maier & Neustadt, L.L.P.

(57) ABSTRACT

In an electric parking brake system, a first position (Park) is tentatively determined and also finally determined before the initial check is completed. Even when a second position is tentatively determined before the initial check is completed, the second position is finally determined after the initial check is completed. Then, a determination that the shift position has been changed is made. When a release command is issued based on the determination that the shift position has been changed, an electric motor is operated to release parking brakes.

5 Claims, 15 Drawing Sheets

ELECTRIC PARKING BRAKE SYSTEM AND METHOD FOR CONTROLLING THE ELECTRIC PARKING BRAKE SYSTEM

INCORPORATION BY REFERENCE

The disclosure of Japanese Patent Application No. 2006-251804 filed on Sep. 15, 2006 including the specification, drawings and abstract is incorporated herein by reference in its entirety.

BACKGROUND OF THE INVENTION

1. Field of the Invention

The invention relates generally to an electric parking brake system and a method for controlling the electric parking brake system, and, more specifically, to an automatic release of a brake in response to a shifting operation in an electric parking brake system.

2. Description of the Related Art

Japanese Patent Application Publication No. JP-07-144623 (JP-A-07-144623) describes a technology related to an electric parking brake system. According to the technology, when the state in which the shift position is in Neutral or Park continues for a predetermined time or longer, a parking brake is automatically applied. When the state in which the shift position is in Drive or Reverse continues for a predetermined time or longer, the parking brake is automatically released. Japanese Patent Application Publication No. JP-2003-327101 (JP-A-2003-327101) describes that a parking brake is automatically released when the shift position is changed to Drive or Reverse.

SUMMARY OF THE INVENTION

The invention makes it possible to automatically release a brake even when a shifting operation is performed while the operation of the an electric motor is prohibited.

A first aspect of the invention relates to an electric parking brake system including: a brake that includes a rotating body which has a friction face and which rotates together with a wheel, a friction member which is fitted to a non-rotating body so as to be movable relative to the non-rotating body, and a pushing mechanism that pushes the friction member against the friction face of the rotating body; an electric motor; a motion conversion mechanism that converts the rotation of a rotating shaft of the electric motor into the linear motion of an output member of the motion conversion mechanism; a connection unit that is connected at one end to the output member of the motion conversion mechanism, and that is connected at the other end to the pushing mechanism; a maintaining mechanism that maintains the force with which the friction member is pushed against the friction face in the brake, when electric current is not supplied to the electric motor; and a brake release unit that releases the brake by operating the electric motor based on a change in the position of a shifting operation member. In the electric parking brake system according to the first aspect of the invention, the brake release unit includes an after-permission brake release unit. When the shift position which is the position of the shifting operation member is changed while the operation of the electric motor is prohibited, the after-permission brake release unit makes a determination, at the same time that the operation of the electric motor is permitted or after the operation of the electric motor is permitted, that the shift position has been changed, and releases the brake.

In the electric parking brake system, when the electric motor is operated, the rotation of the output shaft of the electric motor is converted into the linear motion of the output member and the connection unit is pulled. In the brake, the friction member is pushed against the friction face by the pushing mechanism, whereby the brake is applied. The pushing force in the brake is maintained by the maintaining mechanism even when electric current is not supplied to the electric motor. In the electric parking brake system according to the first aspect of the invention, the brake is released by operating the electric motor based on a change in the shift position. For example, when the shift position is changed by changing the position of the shifting operation member from a position, for example, Neutral or Park, at which a vehicle is instructed to be at a standstill, to a position, for example, Drive or Reverse, at which the vehicle is instructed to move, it is determined that the driver intends to start the vehicle. Then, the brake is automatically released by operating the electric motor. When the shift position is changed while the operation of the electric motor is prohibited, a determination that the shift position has been changed is made at the same time that the operation of the electric motor is permitted or after the operation of the electric motor is permitted. Then, the electric motor is operated in response to the determination that the shift position has been changed. As a result, even when the shifting operation is performed while the operation of the electric motor is prohibited, the brake is released. The determination that the shift position has been changed may be made at the same time that the operation of the electric motor is permitted or after the operation of the electric motor is permitted. The determination that the shift position has been changed may be made at the same time that the change in the shift position is detected, or after the change in the shift position is detected. For example, when the change in the shift position is detected at the same time that the operation of the electric motor is permitted or after the operation of the electric motor is permitted, the determination that the shift position has been changed is made at the same time that the change in the shift position is detected. When the change in the shift position is detected before the operation of the electric motor is permitted, the determination that the shift position has been changed is made at the same time that the operation of the electric motor is permitted or after the operation of the electric motor is permitted. When the shift position is changed from the first shift position to the second shift position, the determination that the shift position has been changed is made at the same time that the second shift position is determined or after the second shift position is determined. For example, when the second shift position is determined at the same time that the operation of the electric motor is permitted or after the operation of the electric motor is permitted, the determination that the shift position has been changed is made at the same time that the second shift position is determined or after the second shift position is determined. When the second shift position is determined before the operation of the electric motor is permitted, the change in the shift position is detected before the operation of the electric motor is permitted but the determination that the shift position has been changed is made at the same time that the operation of the electric motor is permitted or after the operation of the electric motor is permitted.

A second aspect of the invention relates to the electric parking brake system according to the first aspect of the invention. According to the second aspect of the invention, the operation of the electric motor is prohibited for at least the period from when an ignition switch of the vehicle is turned on until when the initial check is completed, and the after-permission brake release unit includes a during-prohibition shift position determination unit that determines the shift position while the operation of the electric motor is prohibited.

The operation of the electric motor is prohibited for at least the period from when the ignition switch of the vehicle is turned on until when the initial check is completed. When it is determined by the initial check that the system is in the abnormal state, the operation of the electric motor is prohibited even after the initial check is completed. On the other hand, when it is determined by the initial check that the system is in the normal state, the operation of the electric motor is permitted after the initial check is completed. Accordingly, when the system is in the normal state, the operation of the electric motor is prohibited until the initial check is completed. When the system is in the abnormal state, the operation of the electric motor is prohibited even after the initial check is completed. In the electric parking brake system according to the second aspect of the invention, the shift position is determined even while the operation of the electric motor is prohibited. More specifically, the shift position is determined after the operation of a computed is permitted, even while the operation of the electric motor is prohibited. Therefore, even if the driver operates the shifting operation member before the initial check is completed, the shift position is determined. The during-prohibition shift position determination unit may be a unit that determines the first shift position but does not determine the second shift position. Alternatively, the during-prohibition shift position determination unit may be a unit that determines both the first shift position and the second shift position.

A third aspect of the invention relates to the electric parking brake system according to the first aspect of the invention. The electric parking brake system according to the third aspect of the invention further includes a shift position sensor that detects the position of the shifting operation member. In the electric parking brake system according to the third aspect of the invention, the after-permission brake release unit includes a lag position determination unit. When the shift position detected by the shift position sensor is continuously the same for a predetermined time or longer, the lag position determination unit determines that the shift position detected by the shift position sensor is a first shift position. When the shift position different from the first shift position is continuously detected by the shift position sensor for a predetermined time or longer, the lag position determination unit determines, at the same time that the operation of the electric motor is permitted or after the operation of the electric motor is permitted, that the shift position different from the first shift position is a second shift position, and makes a determination that the shift position has been changed.

In the electric parking brake system according to the third aspect of the invention, when the second shift position is determined, the determination that the shift position has been changed is made. The first shift position is determined when the shift position sensor continuously detects the same shift position for the predetermined time or longer. Accordingly, the first shift position is determined even when the operation of the electric motor is not permitted, that is, regardless of whether the operation of the electric motor is permitted.

A fourth aspect of the invention relates to the electric parking brake system according to the first aspect of the invention. The electric parking brake system according to the fourth aspect of the invention further includes a shift position sensor that detects the position of the shifting operation member; and a shift position determination unit that determines the shift position detected by the shift position sensor has been selected, when the shift position detected by the shift position sensor is continuously the same for a predetermined time or longer. In the electric parking brake system according to the fourth aspect of the invention, the after-permission brake release unit includes a lag change determination unit. When the shift position determination unit determines both a first shift position and a second shift position that differs from the first shift position while the operation of the electric motor is prohibited, the lag change determination unit makes a determination, at the same time that the operation of the electric motor is permitted or after the operation of the electric motor is permitted, that the shift position has been changed.

When the first shift position and the second shift position are determined and a change in the shift position is detected while the operation of the electric motor is prohibited, the determination that the shift position has been changed is made at the same time that the operation of the electric motor is permitted or after the operation of the electric motor is permitted. It is considered that the change detected while the operation of the electric motor is prohibited is stored until the operation of the electric motor is permitted.

A fifth aspect of the invention relates to the electric parking brake system according to the first aspect of the invention. According to the fifth aspect of the invention, the after-permission brake release unit includes a shifting operation-based release unit that releases the brake when the shift position is changed from a shift position at which a vehicle is at a standstill to a shift position at which the vehicle moves.

For example, when the shift position is changed from Park or Neutral to Drive or Reverse, the brake is released. Alternatively, when the shift position is changed from Park to Drive or Reverse, the brake is released, and when the shift position is changed from Neutral to Drive or Reverse, the brake is not released.

A sixth aspect of the invention relates to an electric parking brake system including: a brake that includes a rotating body which has a friction face and which rotates together with a wheel, a friction member which is fitted to a non-rotating body so as to be movable relative to the non-rotating body, and a pushing mechanism that pushes the friction member against the friction face of the rotating body; an electric motor; a motion conversion mechanism that converts the rotation of a rotating shaft of the electric motor into the linear motion of an output member of the motion conversion mechanism; a connection unit that is connected at one end to the output member of the motion conversion mechanism, and that is connected at the other end to the pushing mechanism; a maintaining mechanism that maintains the force with which the friction member is pushed against the friction face in the brake, when electric current is not supplied to the electric motor; and a brake release unit that releases the brake by operating the electric motor based on a change in the position of a shifting operation member. In the electric parking brake system according to the sixth aspect of the invention, the brake release unit includes a during-prohibition shift position determination unit that determines the shift position which is the position the shifting operation member within the period from when an ignition switch of a vehicle is turned on until when the initial check is completed.

A seventh aspect of the invention relates to a method for controlling an electric parking brake system including: a brake that includes a rotating body which has a friction face and which rotates together with a wheel, a friction member which is fitted to a non-rotating body so as to be movable relative to the non-rotating body, and a pushing mechanism that pushes the friction member against the friction face of the rotating body; an electric motor; a motion conversion mechanism that converts the rotation of a rotating shaft of the electric motor into the linear motion of an output member of the motion conversion mechanism; a connection unit that is connected at one end to the output member of the motion conversion mechanism, and that is connected at the other end to the pushing mechanism; a maintaining mechanism that maintains the force with which the friction member is pushed against the friction face in the brake, when electric current is not supplied to the electric motor; and a brake release unit that releases the brake by operating the electric motor based on a change in the position of a shifting operation member. According to the method, when the shift position which is the position of the shifting operation member is changed while the operation of the electric motor is prohibited, a determination that the shift position has been changed is made at the same time that the operation of the electric motor is permitted or after the operation of the electric motor is permitted, and the brake is released.

BRIEF DESCRIPTION OF THE DRAWINGS

The foregoing and further features and advantages of the invention will become apparent from the following description of an example embodiment with reference to the accompanying drawings, wherein the same or corresponding portions will be denoted by the same reference numerals and wherein.

DETAILED DESCRIPTION OF THE EMBODIMENT

Figure 1:
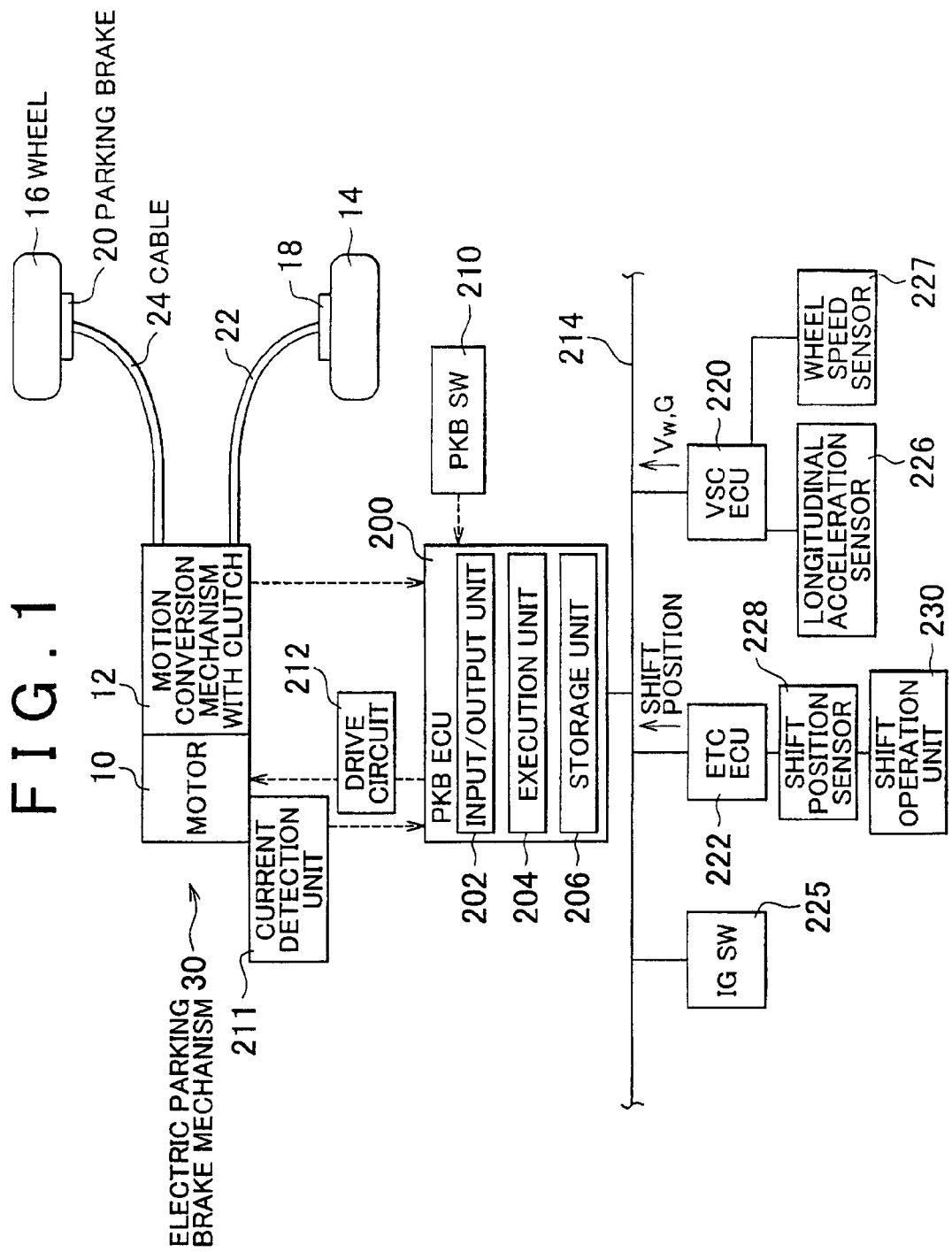
FIG. 1 is an overall view showing an electric parking brake system according to an embodiment of the invention.

An electric parking brake system according to an embodiment of the invention will be described in detail with reference to the accompanying drawings. FIG. 1 shows an electric motor 10 and a motion conversion mechanism 12 with a clutch. The motion conversion mechanism 12 with a clutch converts the rotation of an output shaft 52 of the electric motor 10 into the liner motion of an output member, and prevents the electric motor 10 from being rotated due to a force applied to the output member. FIG. 1 also shows wheels 14 and 16, and parking brakes 18 and 20 that are provided to the wheels 14 and 16, respectively. The parking brakes 18 and 20 are connected to the motion conversion mechanism 12 via cables 22 and 24, respectively. When the cables 22 and 24 are pulled due to the operation of the electric motor 10, the parking brakes 18 and 20 are applied. According to the embodiment of the invention, the electric motor 10, the motion conversion mechanism 12 with a clutch, the cables 22 and 24, the parking brakes 18 and 20, etc. constitute an electric parking brake mechanism 30.

Figure 2:
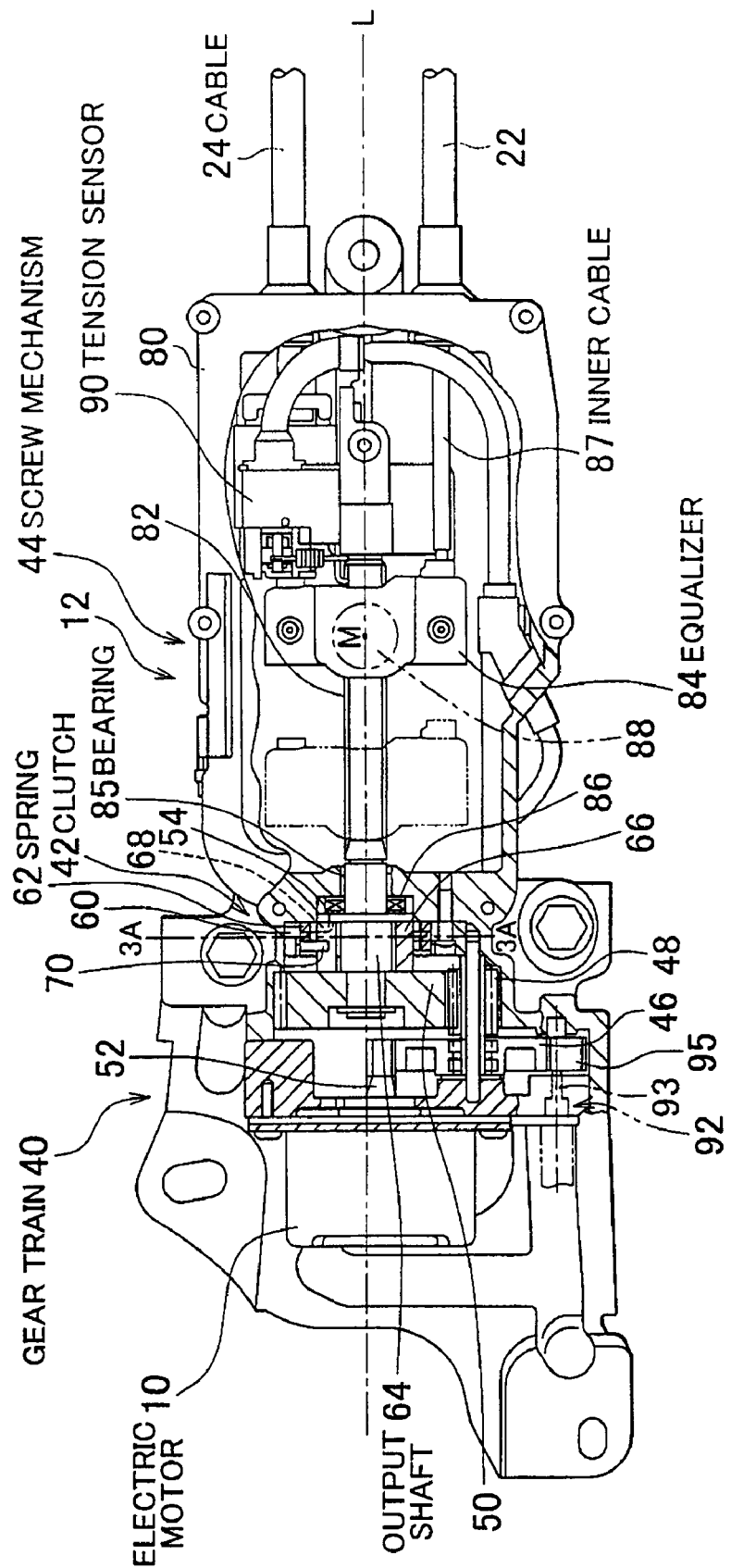
FIG. 2 is a cross-sectional view showing an electric motor and a motion conversion mechanism included in the electric parking brake system.
Figure 3:
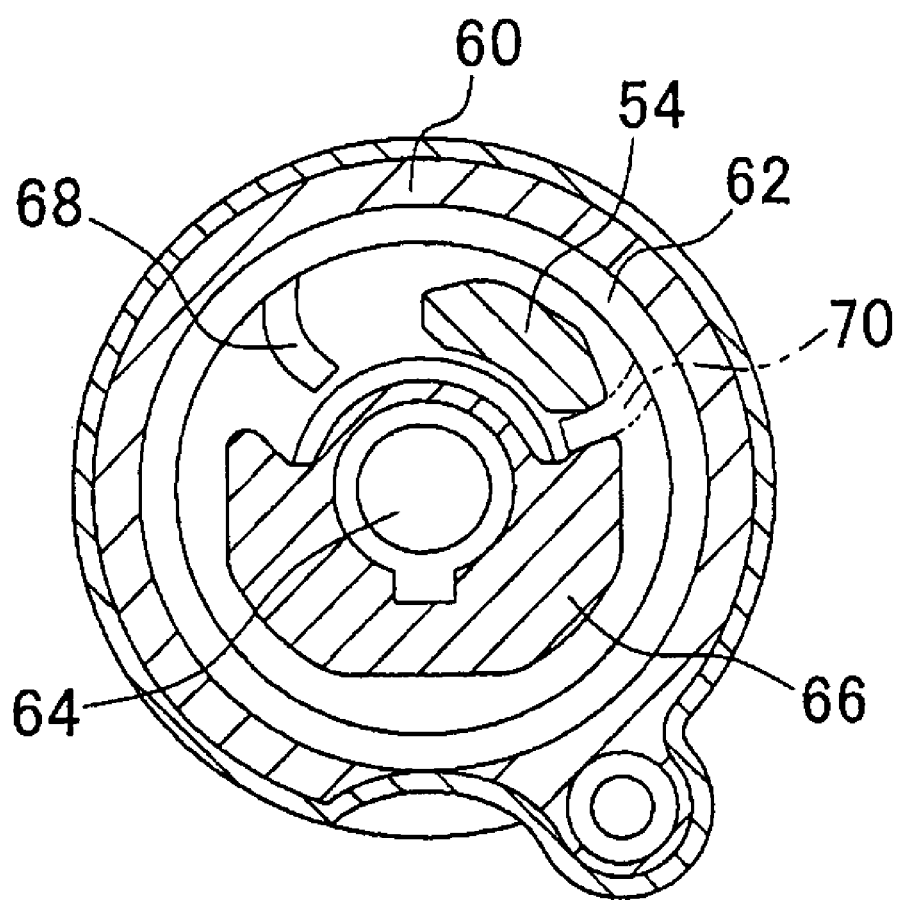
FIG. 3 is a cross-sectional view showing the motion conversion mechanism, taken along the line 3A-3A in FIG. 2 (a cross-sectional view of a clutch)
Figure 13:
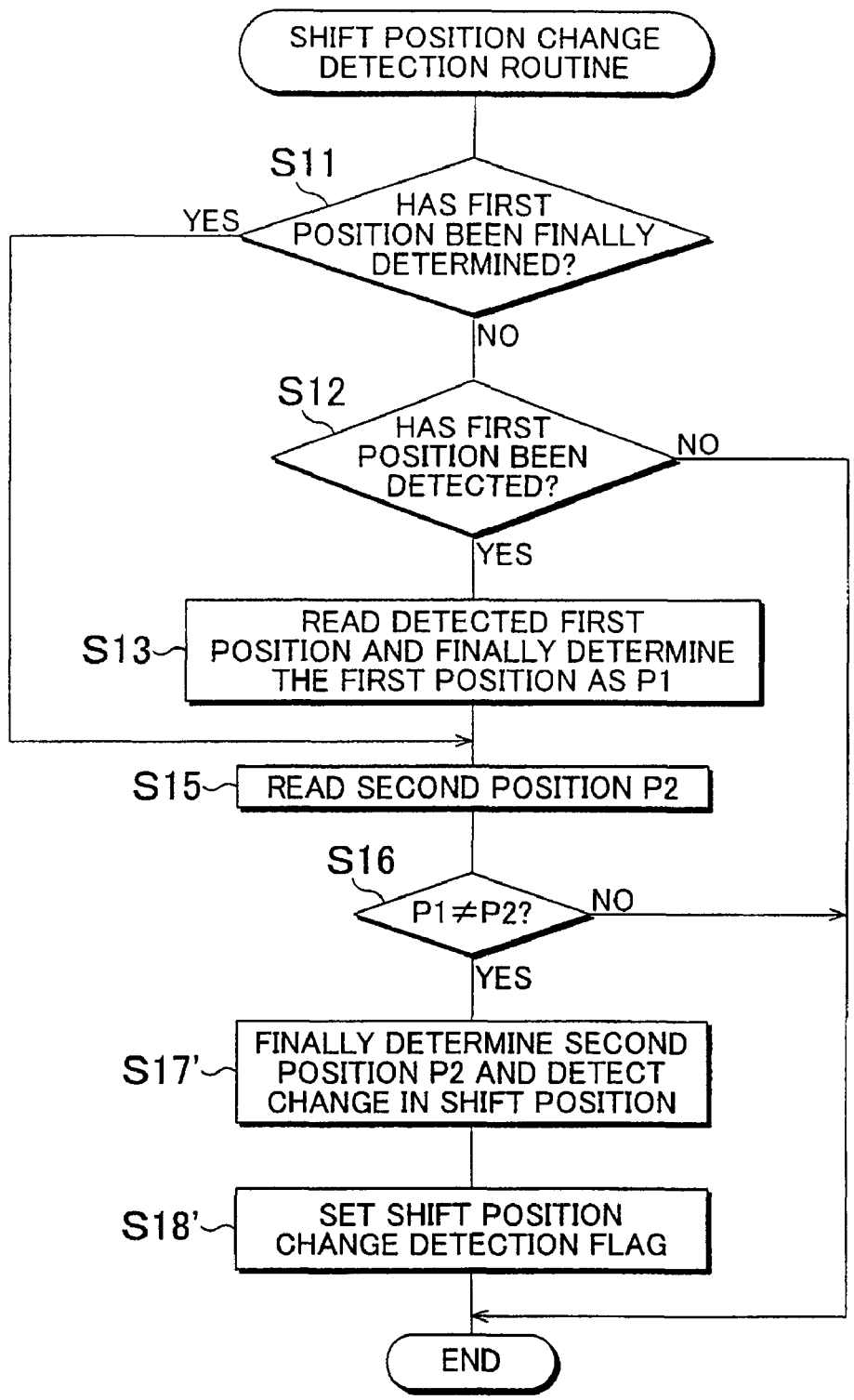
FIG. 13 is a flowchart showing the shift position change detection routine stored in the storage unit of the electric parking brake ECU 200.

The motion conversion mechanism 12 with a clutch includes a gear train 40, a clutch 42, a screw mechanism 44, etc. as shown in FIG. 2. The gear train 40 is formed of multiple gears 46, 48 and 50. The gear 46 is meshed with the output shaft 52 of the electric motor 10, whereby the rotation of the gear 46 is transferred to the gear 50 via the gear 48. A drive power transfer unit 54 extends, in the axial direction, from the end face of the gear 50, the end face being opposite to the electric motor 10. The output shaft 52 has the function as a gear. The clutch 42 is a one-way clutch. As shown in FIG. 13, the clutch 42 includes a housing 60, a coil spring 62 that is provided on the inner peripheral side of the housing 60, and a rotor 66 that rotates together with an output shaft 64 of the clutch 42. The coil spring 62 is closely fitted to the housing 60 with its coil diameter elastically and slightly reduced. The outer peripheral face of the coil spring 62 closely contacts the inner peripheral face of the housing 60, and ends 68 and 70 of the wire, which forms the coil spring 62, projects inwardly. The drive power transfer unit 54 of the gear 50 is positioned in one of the two spaces defined by the two ends 68 and 70, and the rotor 66 is positioned in the other of these two spaces.

When the gear 50 rotates in accordance with the rotation of the electric motor 10, the drive power transfer unit 54 contacts one of the ends 68 and 70, and the coil spring 62 is wound up, which reduces the frictional force between the inner peripheral face of the housing 60 and the outer peripheral face of the coil spring 62. This allows the coil spring 62 and the rotor 66 to rotate. As a result, the output shaft 64 rotates. Because the output shaft 64 rotates together with the gear 50, the rotation of the electric motor 10 is transferred to the output shaft 64 via the clutch 42. If a torque is applied to the output shaft 64 when electric currents are not supplied to the electric motor 10, the rotor 66 contacts one of the ends 68 and 70. This increases the coil diameter of the spring coil 62. Then, the frictional force between the outer peripheral face of the coil spring 62 and the inner peripheral face of the housing 60 increases, and therefore the rotation of the coil spring 62 is interrupted. Transfer of the torque from the output shaft 64 to the gear 50 is interrupted by the clutch 42. When electric currents are not supplied to the electric motor 10, the rotation of the electric motor 10 due to the torque applied to the output shaft 64 is not caused.

The screw mechanism 44 includes a housing 80, a male screw member 82 that extends in parallel with the axis L, a nut (not shown) that is fitted to the male screw member 82, and an equalizer 84 that is fitted to the nut so as to be able to rotate about the axis M. The male screw member 82 is supported, via a pair of radial bearings 85 (one of the radial bearings 85 is not shown FIG. 2) and a needle thrust bearing 86, by the housing 80 so as to be able to rotate relative to the housing 80. An inner cable 87 of the cable 22 and an inner cable 87 of the cable 24 are connected to respective arms of the equalizer 84. A fitting projection 88 is formed on a body of the equalizer 84. Although not shown in the FIG. 2, the equalizer 84 is fitted in a guide portion that is formed in the housing 80 and that extends in parallel with the axis L. With this structure, the equalizer 84 is not rotatable about the axis L relative to the housing 80, movable in the direction parallel to the axis L relative to the housing 80, and pivotal about the fitting projection 88 (about the axis M).

The equalizer 84 is movable relative to the housing 80, within the range between the position indicated by the solid lines and the position indicated by the dashed-two dotted lines shown in FIG. 2. As the equalizer 84 moves relative to the housing 80, the inner cables 87 of the cables 22 and 24 are pulled or slackened. The equalizer 84 pivots about the fitting projection 88 (about the axis M) such that the tension applied to the inner cable 87 of the cable 22 and the tension applied to the inner cable 87 of the cable 24 (hereinafter, simply referred to as the tension of the cable 22 and the tension of the cable 24) are equal to each other. A tension sensor 90 that detects the tension of the cable 24 is provided in the housing 80. Because the tension of the cable 22 and the tension of the cable 24 are equalized by the equalizer 84, the tension of the cable 24, which is detected by the tension sensor 90, is equal to the tension of the cable 22. A malfunction-time release device 92 is shown in FIG. 2. The malfunction-time release device 92 releases the parking brakes 18 and 20, for example, when the electric motor 10 malfunctions. A cable 93 is pushed into a gear 95 and a grip portion (not shown) is then manually rotated, whereby the gear 95 is rotated. The rotation of the gear 95 is transferred to the gear 50 via the gears 46 and 48, and the rotation of the gear 50 moves the equalizer 84 such that the cables 22 and 24 are slackened. As a result, the parking brakes 18 and 20 are released.

Figure 4:
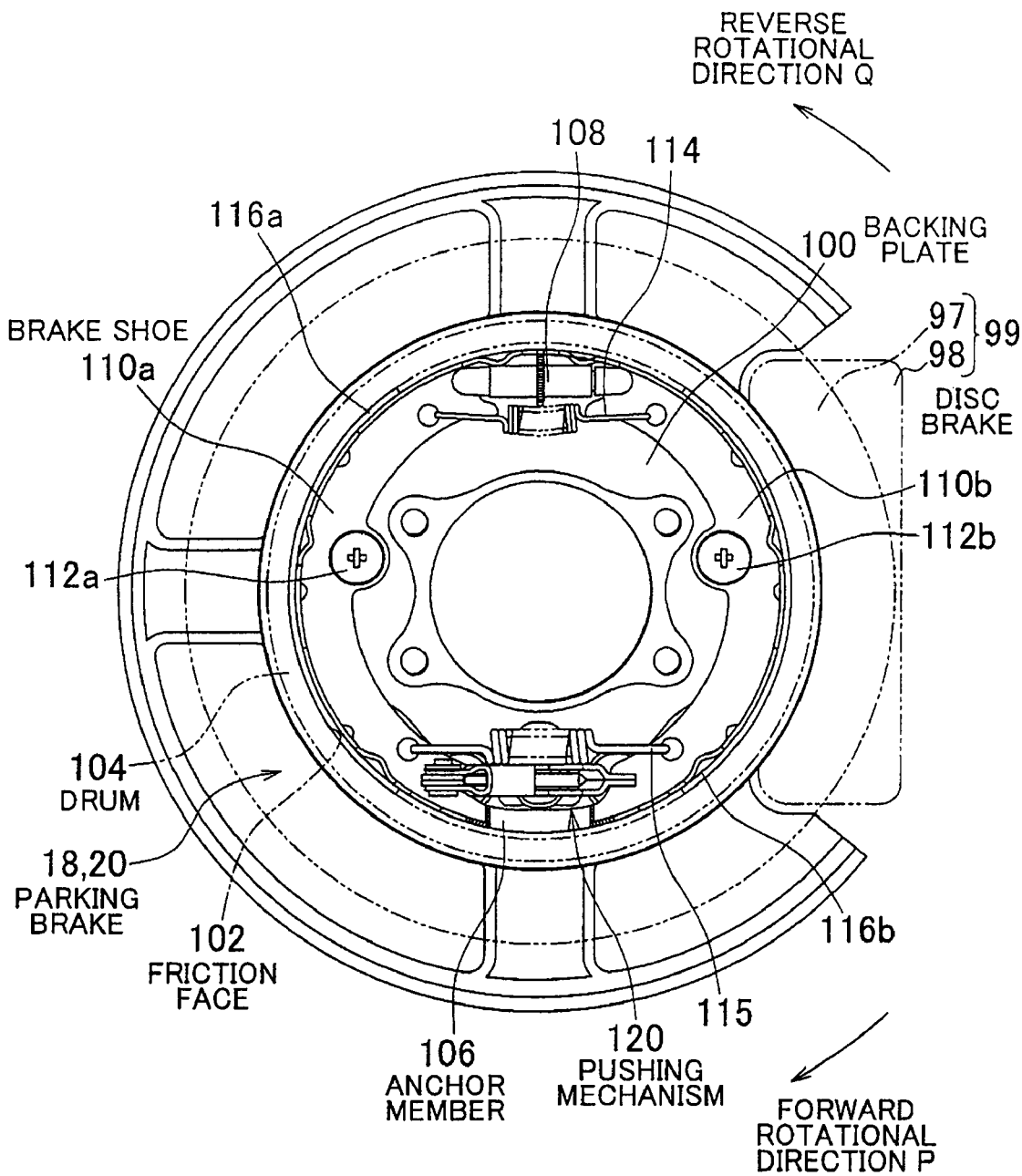
FIG. 4 is a front view showing a drum brake included in the electric parking brake system.
Figure 5:
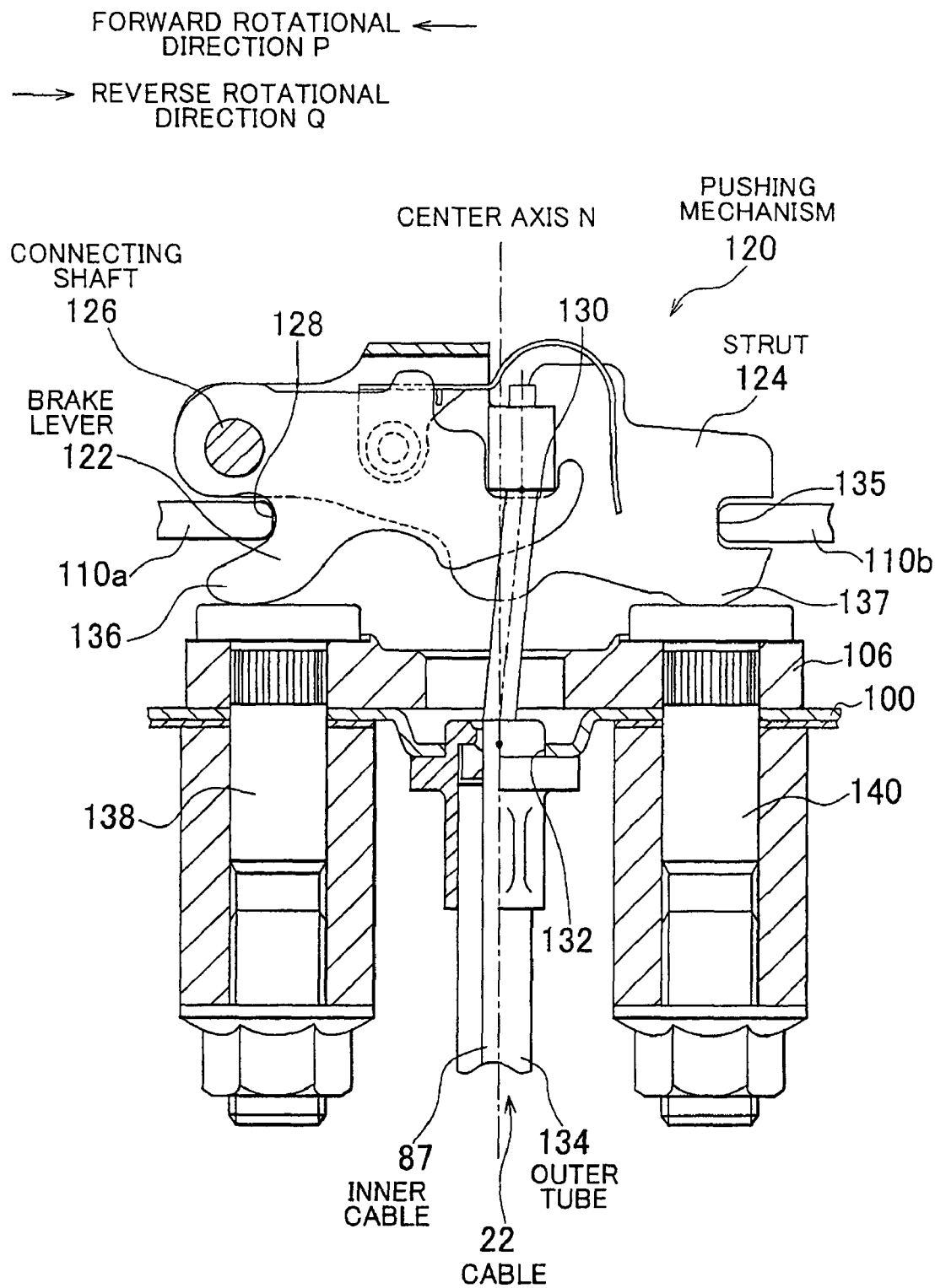
FIG. 5 is a front view showing a pushing mechanism of the drum brake.

As shown in FIGS. 4 and 5, the parking brakes 18 and 20 are duo-servo drum brakes, in the embodiment of the invention. Accordingly, the parking brakes 18 and 20 will be sometimes referred to as the drum brakes if necessary. In FIG. 4, a brake disc 97 and a caliper 98 are shown. The brake disc 97 and the caliper 98 constitute a disc brake 99 which serves as a service brake. Each of the drum brakes used as the parking brakes 18 and 20 is provided on the inner peripheral side of the brake disc 97. In the embodiment of the invention, the parking brakes 18 and 20 are drum-in disc-brakes. Because the drum brakes 18 and 20 have the same structure, the drum brake 18 will be described below, and the description concerning the drum brake 20 is omitted.

The drum brake 18 includes a backing plate 100 that is a non-rotating member fitted to a vehicle body (not shown), and a drum 104 of which the inner peripheral face is used as a friction face 102 and which rotates together with the wheel 14. An anchor member 106 and an adjuster 108, which serves as a relay link, are provided on the backing plate 100, at positions that are apart from each other along one diameter of the backing plate 100. The anchor member 106 is fixed to the backing plate 100, and the adjuster 108 is a floating member. Between the anchor member 106 and the adjuster 108, a pair of arc-shaped brake shoes 110a and 110b are arranged so as to face the inner peripheral face of the drum 104. The brake shoes 110a and 110b are fitted to the backing plate 100 by shoe-hold-down devices 112a and 112b, respectively, so as to be movable along the backing plate 100. A through-hole is formed at the center of the backing plate 100 to allow an axle shaft (not shown) to pass through the through-hole.

The brake shoe 110a and the brake shoe 110b are operatively connected, at their one ends, to each other by the adjuster 108. Meanwhile, the other ends of the brake shoe 110a and the brake shoe 110b are pivotally supported by the anchor member 106. The one ends of the brake shoes 110a and 110b are biased by an adjuster spring 114 such that the one ends of the brake shoes 110a and 110b approach the adjuster 108, while the other ends of the brake shoes 110a and 110b are biased by a return spring 115 such that the other ends of the brake shoes 110a and 110b approach the anchor member 106. Brake linings 116a and 116b, which serve as friction members, are held on the outer peripheral faces of the brake shoes 110a and 110b, respectively. When the brake linings 116a and 116b contact the friction face 102 of the drum 104, a frictional force is produced between the brake linings 116a and 116b, and the drum 104. The adjuster 108 is operated to adjust the amount of clearance between the paired brake linings 116a and 116b, and the drum 104 in accordance with the degree of wearing of the brake shoes 110a and 110b.

FIG. 5 shows a pushing mechanism 120. The pushing mechanism 120 includes a brake lever 122 and a strut 124. The pushing mechanism 120 is supported by the top portions of bolts 138 and 140 with which the anchor member 106 is fixed to the backing plate 100 so as to be movable relative to the top portions of the bolt 138 and 140. The brake lever 122 and the strut 124 are plate-like members. The brake lever 122 is interposed between two plate members that form the strut 124. In this state, the brake lever 122 and the strut 124 are connected, at their one ends, to a connecting shaft 126 so as to be pivotal with respect to each other. The brake lever 122 has a fit portion 128 that is formed at a position between the connecting shaft 126 and the backing plate 100. The brake shoe 110a is fitted to the fit portion 128. The inner cable 87 of the cable 22 is connected to a fit portion 130 formed at the end portion that is apart from the connecting shaft 126 in the direction parallel to the backing plate 100. The inner cable 87 is guided by an outer tube 134, of which one end is fixed at a through-hole 132 formed in the backing plate 100, and juts out the backing plate 100 and extends from the face opposite to the face on which the brake shoes 110a and 110b are arranged. The strut 124 has a fit portion 135 that is formed at the end portion on the opposite side of the connecting shaft 126. The brake shoe 110b is fitted to the fit portion 135. In the state shown in FIG. 5, the fit portion 130 is positioned on the reverse rotational direction side with respect to the center axis N of the through-hole 132 (the center axis N of the cable 22, at a position at which the cable 22 is fixed to the backing plate 100). As described below, when the pushing mechanism 120 is relatively moved in the circumferential direction, the fit portion 130 also relatively moves in accordance with the movement of the pushing mechanism 120. However, the fit portion 130 is designed not to move to the position on the forward rotational direction side with respect to the center axis N.

The pushing mechanism 120 is supported, at supported portions 136 and 137, by the top portions of the bolts 138 and 140, respectively. When the inner cable 87 is pulled, the brake lever 122 pivots about the contact point between the supported portion 136 and the top portion of the bolt 138. As a result, the connecting shaft 126 and the strut 124 are moved rightward in FIG. 5, and the strut 124 pushes the brake shoe 110b rightward. At this time, a reaction force from the brake shoe 110b is transferred to the brake shoe 110a through the strut 124, the connecting shaft 126 and the brake lever 122, and therefore the brake shoe 110a is pushed leftward in FIG. 5. The same degree of applying force is applied to each of the brake shoes 110a and 110b such that the brake shoes 110a and 110b is each pushed out against the drum 104. As a result, the brake linings 116a and 116b are pushed against the inner peripheral face (the friction face) 102 of the drum 104 with the same degree of force. The tension of the cable 22 is amplified based on the arm ratio of the brake lever 122, and the applying force, which is obtained by subtracting the force corresponding to the frictional force between the supported portions 136 and 137, and the top portions of the bolts 138 and 140 from the amplified force, is applied to the brake shoes 110a and 110b.

Figure 6:
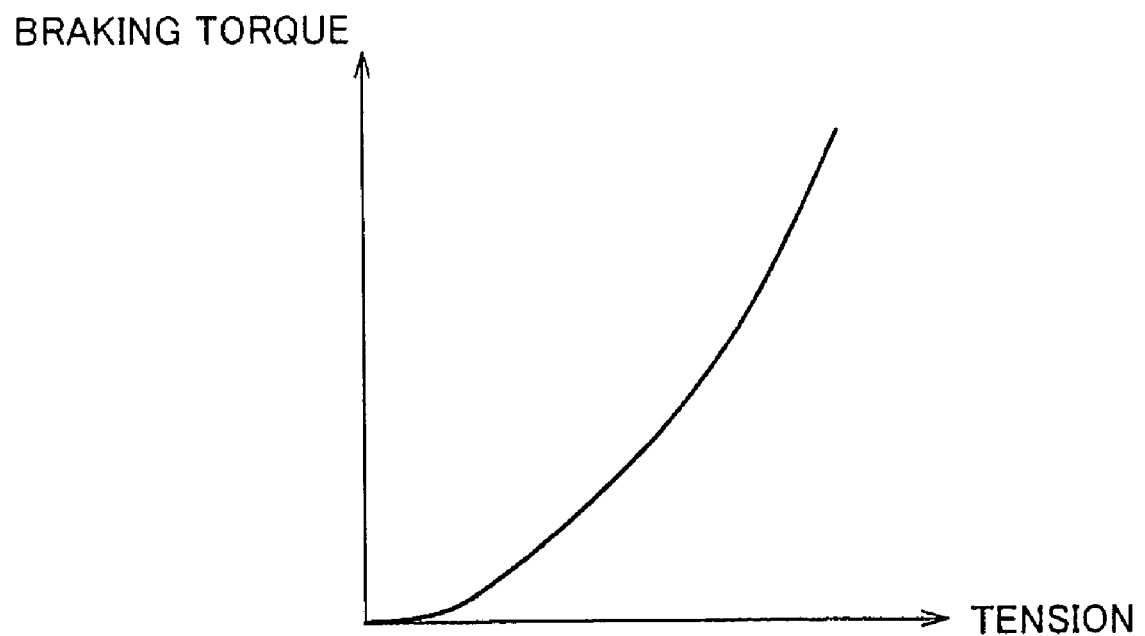
FIG. 6 is a graph showing the relationship between the tension and the braking torque in the electric parking brake system.

If the drum brake 18 is applied when a torque is applied to the drum 104, a force is applied from the drum 104 to the brake shoes 110a and 110b in the circumferential direction, and one of the brake shoes 110a and 110b contacts the anchor member 106, whereby so-called duo-servo effect is produced. If a torque is applied in the forward rotational direction (the direction in which the wheel rotates when a vehicle moves forward) P, due to the self-servo effect, the brake shoe 110a is pushed against the drum 104 with a larger force than when the brake shoe 110a is pushed against the drum 104 with only the applying force (the pressure applied per unit area of the portion, at which the brake shoe 110a contacts the drum 104, increases). The force in the circumferential direction due to the self-servo effect together with the applying force is transferred to the brake shoe 110b by the adjuster 108. As a result, the brake shoe 110b is pushed against the drum 104 stronger than the brake shoe 110a is. The brake shoe 110b contacts the anchor member 106, whereby a braking torque is produced. On the other hand, when a torque is applied in the reverse rotational direction (the direction in which the wheel rotates when the vehicle backs up) Q, the brake shoe 110a is pushed against the drum 104 stronger than the brake shoe 110b is. The degree of force with which the brake shoes 110a and 110b push the friction members against the drum 104 (hereinafter, referred to as the "friction member pushing force") corresponds to the degree of tension of the cable 22. The relationship between the tension and the braking torque is expressed by the curve shown in the FIG. 6. When the vehicle is at a standstill and the coefficient of friction between the brake linings 116a and 116b and the inner peripheral face (the friction face) 102 of the drum 104 is constant, a certain relationship is established among the braking torque, the frictional force, the pushing force and the applying force. As the applying force increases, the pushing force, the frictional force and the braking torque also increase. Accordingly, for example, based on the relationship between the tension and the applying force, it is possible to determine the relationship between the tension and the pushing force, the relationship between the tension and the frictional force, and the relationship between the tension and the braking torque.

As shown in FIG. 1, the electric motor 10 is controlled based on a command from the electric parking brake ECU 200. The electric parking brake ECU 200 is formed mainly of a computer, and includes an input/output unit 202, an execution unit 204, a storage unit 206, etc. A parking brake switch (hereinafter, simply referred to as a "parking switch") 210, the tension sensor 90 (see FIG. 2), a current detection unit 211, etc. are connected to the input/output unit 202. In addition, the electric motor 10 is connected to the input/output unit 202 via a drive circuit 212. The electric motor 10 is an actuator of the electric parking brake. The electric parking brake ECU 200 is connected, via a CAN (Controller Area Network) 214, to the other computers mounted in the vehicle such as a slip control ECU (VSC ECU) 220, an engine/transmission ECU (ETC ECU) 222, an ignition switch 225, etc. A longitudinal acceleration sensor 226 and a wheel speed sensor 227 are connected to the slip control ECU 220. A shift position sensor 228 is connected to the engine/transmission ECU 222. Therefore, the information including the longitudinal acceleration, the shift position, the wheel speed (or the vehicle speed), etc. is transmitted to the electric parking brake ECU 200 via the slip control ECU 220, the engine/transmission ECU 222, and the CAN 214.

The parking switch 210 is operated to issue a command to apply the parking brakes 18 and 20 or a command to release the parking brakes 18 and 20 (hereinafter, release of the parking brakes 18 and 20 will be sometimes referred to as "release of the cables 22 and 24"). The parking switch 210 may include, for example, an application operation unit and a release operation unit. When the application operation unit is operated (hereinafter, referred to as "when the application command operation is performed"), it is determined that the parking brakes 18 and 20 are required to be applied. When the release operation unit is operated (hereinafter, referred to as "when the release command operation is performed"), it is determined that the barking brakes 18 and 20 are required to be released. The tension sensor 90 detects the tension of the cables 22 and 24, as described above. As shown in FIG. 2, the tension sensor 90 is arranged in the housing 80 of the motion conversion mechanism 12. The current detection unit 211 detects the value of electric current that actually passes through the electric motor 10. The operating state of the electric motor 10 is determined based on the value of electric current passing through the electric motor 10. The shift position sensor 228 detects the position of a shifting operation unit 230. The longitudinal acceleration sensor 226 detects the acceleration of the vehicle applied in the longitudinal direction. In the embodiment of the invention, the inclination angle of the vehicle is determined based on the longitudinal acceleration of the vehicle.

In the electric parking brake system, the parking brakes 18 and 20 are applied in response to the operation of the parking switch 210 or the operation of the shifting operation member 230. When the application command operation is performed using the parking switch 210, the electric motor 10 is rotated in the forward direction and therefore the cables 22 and 24 are pulled. In the parking brakes 18 and 20, the brake shoes 110a and 110b are each pushed out against the drum 104. The brake shoes 110a and 110b are pushed against the inner peripheral face 102 of the drum 104, whereby the parking brakes 18 and 20 are applied. The target tension is set based on the inclination angle of the vehicle, the shift position, etc., and the electric motor 10 is controlled such that the actual tension, which is detected by the tension sensor 90, approaches the target tension. When the release command operation is performed, the electric motor 10 is rotated in the reverse direction and therefore the cables 22 and 24 are slackened. In the parking brakes 18 and 20, the brake shoes 110a and 110b are caused to approach each other by the return spring 115, whereby the parking brakes 18 and 20 are released. When the shift position is changed from a shift position, at which the vehicle is at a standstill (Park or Neutral), to a shift position, at which the vehicle is moving (Drive or Reverse), in response to the operation of the shifting operation member 230, the parking brakes 18 and 20 are released. It is considered that the operation of the shifting operation member 230 for changing the shift position from a shift position, at which the vehicle is at a standstill, to a position, at which the vehicle is moving, is performed according to the driver's intention to start the vehicle. Therefore, even when the release command operation using the parking switch 210 is not performed, the parking brakes 18 and 20 are automatically released.

Figure 7:
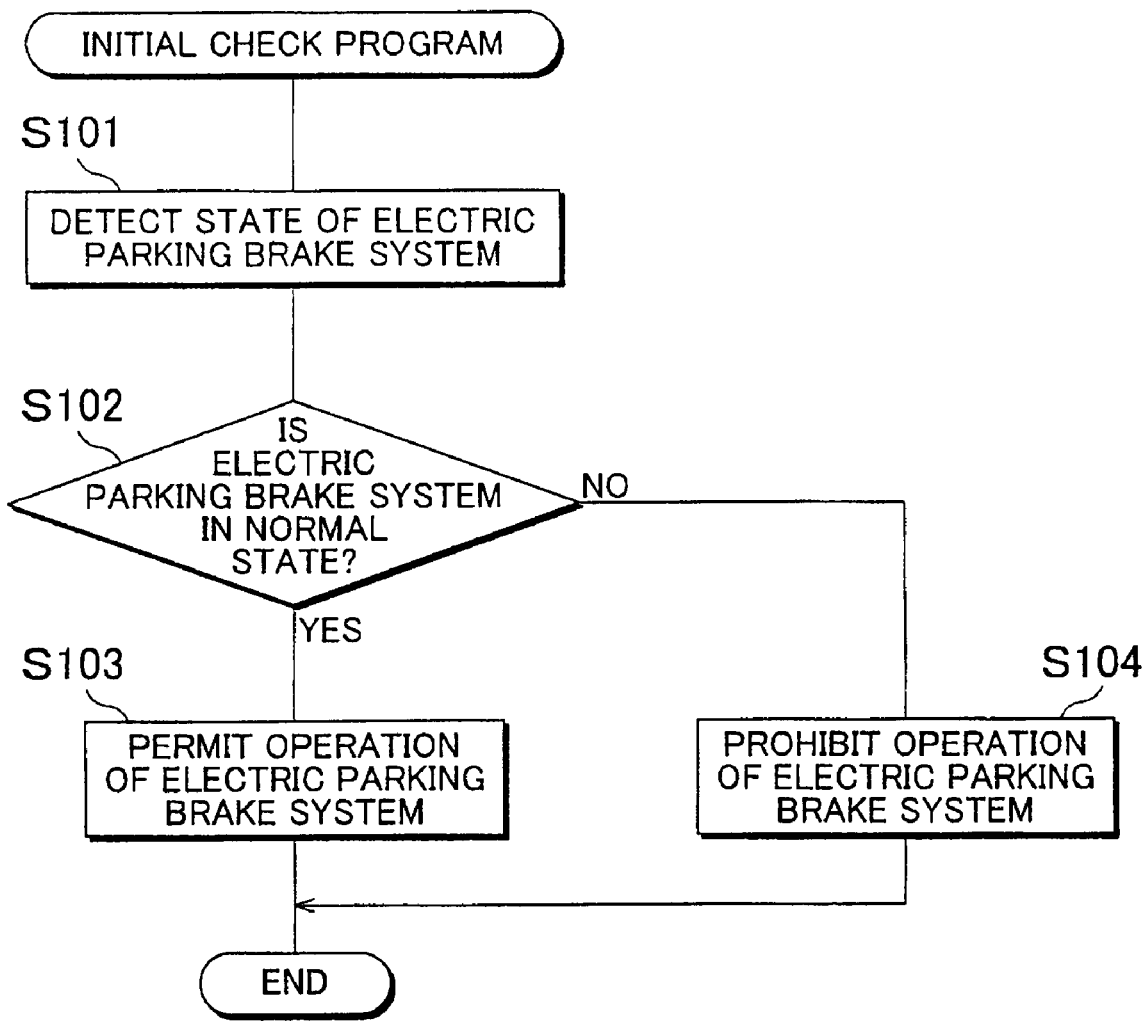
FIG. 7 is a flowchart showing the initial check program stored in a storage unit of an electric parking brake ECU 200 included in the electric parking brake system.

When the ignition switch 25 is turned on, the initial check is usually performed. According to the embodiment of the invention, as shown in the time charts in FIGS. 11 and 12, the ignition switch 225 is turned on at time T1, and the electric parking brake ECU 200 is turned on (the voltage, at which the electric parking brake ECU 200 is operable, is achieved) at time T2 that is reached when a predetermined time has elapsed since time T1. At time T3 that is reached when a predetermined time has elapsed since time T2, the initial check is started. The initial check is performed according to the initial check program shown by the flowchart in FIG. 7. In step 101 (hereinafter, referred to as "S101". The same is applied to other steps), the state of the electric parking brake system is detected. It is determined, for example, whether the information is properly received via the CAN 214, whether the electric motor 10 is in the normal state, whether the tension sensor 90, the parking switch 210, etc. are in the normal state, and whether there is a break in wires. In S102, it is determined whether the electric parking brake system is in the normal state. When the electric parking brake system is in the normal state, an affirmative determination is made, and the operation of the electric parking brake system is permitted and therefore the operation of the electric motor 10 is permitted in S103. When the electric parking brake system is in the abnormal state and should not be operated, a negative determination is made in S102, and the operation of the electric parking brake system is prohibited and therefore the operation of the electric motor 10 is prohibited in S104. The time required to complete the initial check is $\Delta$Tche (T4–T3). The initial check is started at time T3 and completed at time T4. Accordingly, when the electric parking brake system is in the normal state, the operation of the electric motor 10 is permitted at time T4. The case in which the electric parking brake system is in the normal state and the operation of the electric motor 10 is permitted when the initial check is completed will be described below.

In related art, determination of the shift position is not made while the initial check is performed. In contrast, according to the embodiment of the invention, the shift position is determined while the initial check is performed. More specifically, as shown in the time charts in FIGS. 11 and 12, determination of the shift position is started at time T5 that is before time T3 at which the initial check is started, and that is reached when a predetermined time has elapsed since the electric parking brake ECU 200 is turned on (i.e., since time T2). When the shifting operation is performed within a short time after the ignition switch 225 is turned on, the shift position needs to be determined as soon as possible in order to detect a change in the shift position. The shift position is detected by the shift position sensor 228, and the information indicating the shift position is transmitted to the electric parking brake ECU 200 via the CAN 214 at predetermined time intervals (hereinafter, referred to as "reception time intervals"). The electric parking brake ECU 200 receives the information indicating the shift position at predetermined reception time intervals, and reads the shift position from the information received. When the information indicating the same position is continuously received for a predetermined time (hereinafter, referred to as a "position determination time") that is sufficiently longer than the reception time interval, it is tentatively determined that the shift position indicated in the information has been selected. In other words, when the information indicating the same shift position is received at least the number of times (position determination time/reception interval) corresponding to the predetermined position determination time, it is tentatively determined that the shift position indicated in the information has been selected.

Figure 8:
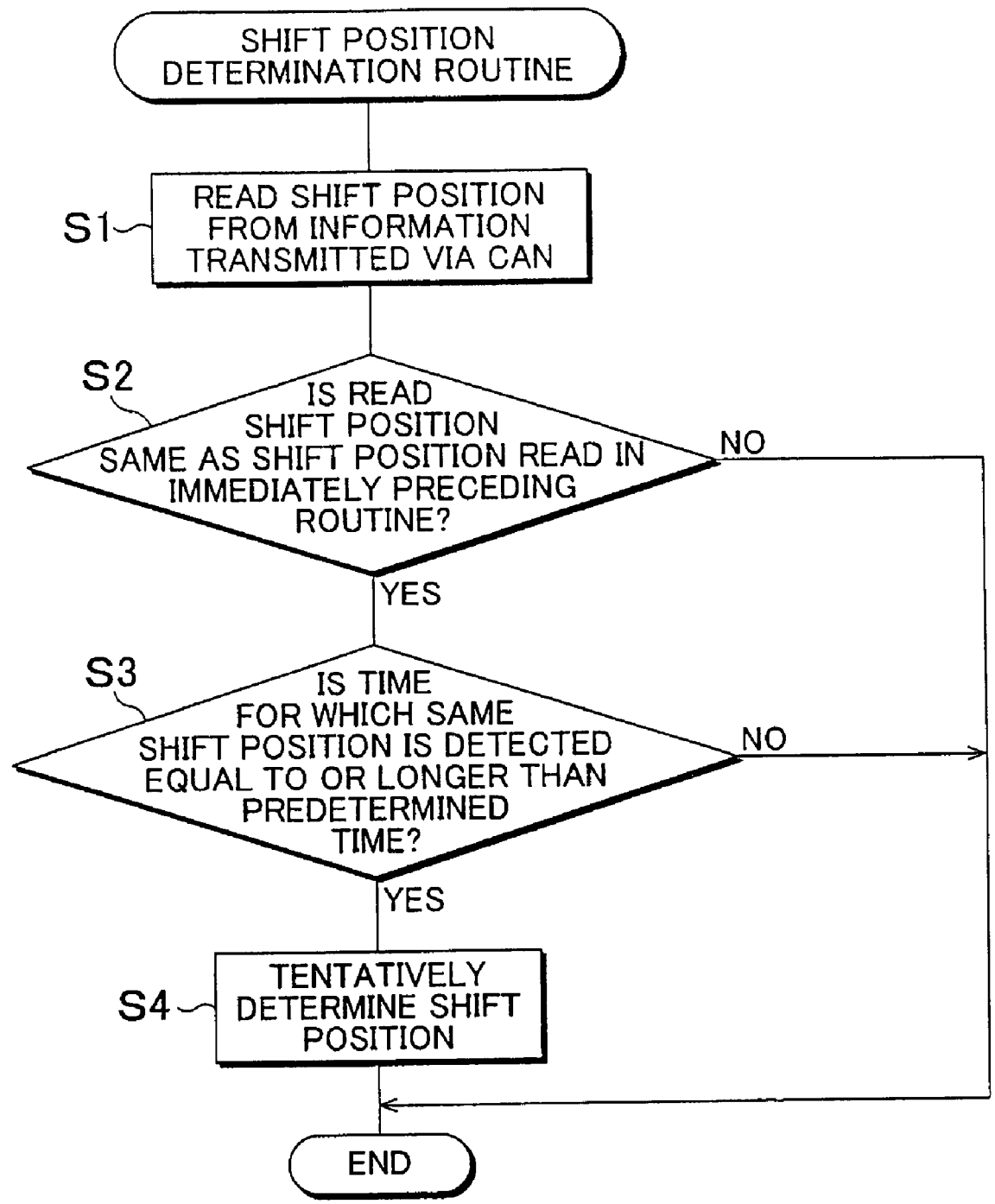
FIG. 8 is a flowchart showing the shift position determination routine stored in the storage unit of the electric parking brake ECU 200.

The shift position determination routine shown by the flowchart in FIG. 8 is executed each time the electric parking brake ECU 200 receives the information via the CAN 214. In S1, the shift position is read from the information received via the CAN 214. In S2, it is determined whether the shift position read in S1 in the current routine is the same as the shift position read in the immediately preceding routine. When it is determined that the shift position read in S1 in the current routine is the same as the shift position read in the immediately preceding routine, it is determined in S3 whether the time for which the information indicating the same shift position is continuously received is equal to or longer than the predetermined time (the position determination time). When the information indicating the same shift position is continuously received for the position determination time or longer, it is tentatively determined in S4 that the shift position indicated in the information has been selected. The measurement of the time, for which the information indicating the same shift position is continuously received, is started, when an affirmative determination is made in S2 for the first time. The measurement is cancelled, when the shift position that differs from the shift position read in the immediately preceding routine is detected and therefore a negative determination is made in S2.

When the shift position is changed from a first shift position (hereinafter, referred to as a "first position") to a second shift position (hereinafter, referred to as a "second position") in response to the operation of the shifting operation member 230, namely, when the shift position is changed from the first position to the second position, if the shift position tentatively determined is the first position, the final determination of the shift position is made regardless of whether the operation of the electric motor 10 has been permitted. In contrast, when the shift position is changed from the first position to the second position, if the shift position tentatively determined is the second position and the operation of the electric motor 10 has been permitted, it is finally determined that the tentatively determined shift position has been selected. On the other hand, when the operation of the electric motor 10 has not been permitted when the shift position is tentatively determined, the final determination of the shift position is made at the same time that the operation of the electric motor 10 is permitted or after the operation of the electric motor 10 is permitted. In the embodiment of the invention, when it is finally determined that the shift position before a shift change is the first position and the shift position after the shift change is the second position, a determination that the shift position has been changed is made. Then, the shift position change determination flag is set.

When the determination that the shift position has been changed is made, it is determined whether the shift position has been changed from a shift position (Park or Neutral), at which the vehicle is instructed to be at a standstill, to a shift position (Drive or Reverse), at which the vehicle is instructed to move. When the shift position is changed from a shift position, at which the vehicle is instructed to be at a standstill, to a shift position, at which the vehicle is instructed to move, in response to the operation of the shifting operation member 230, the parking brakes 18 and 20 are released. Such release of the parking brakes 18 and 20 due to a change in the shift position will be referred to as the shift-associated release control.

Figure 9:
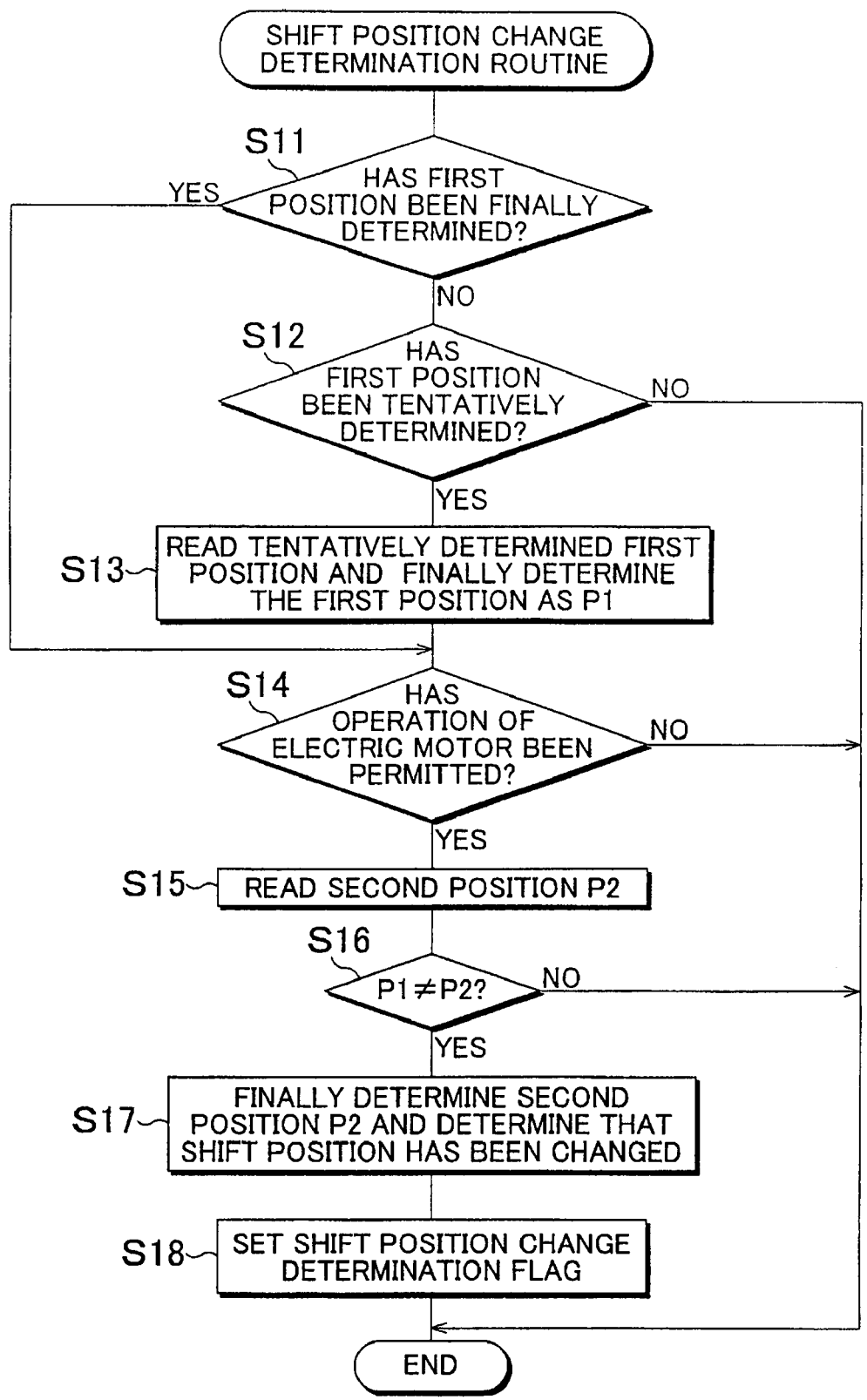
FIG. 9 is a flowchart showing the shift position change determination routine stored in the storage unit of the electric parking brake ECU 200.

FIG. 9 is a flowchart showing the shift position change determination routine. The shift position change determination routine is executed at predetermined time intervals. In S11, it is determined whether the first position has been finally determined. When it is determined that the first position has not been finally determined, it is determined in S12 whether the first position has been tentatively determined. It is determined whether the shift position has been tentatively determined, by executing the shift position determination routine shown by the flowchart in FIG. 8. When the shift position has not been tentatively determined, for example, when the position determination time has not elapsed since the shift position determination routine is started, a negative determination is made in S12. In this case, S11 and S12 are periodically executed until an affirmative determination is made in S12. When the shift position is tentatively determined, in S13 the shift position is read, and it is finally determined that the read shift position is the first position (P1). In this case, it is finally determined that the shift position tentatively determined has been selected.

Next, it is determined in S14 whether the operation of the electric motor 10 has been permitted. When the operation of the electric motor 10 has not been permitted, for example, when the initial check has not been completed, a negative determination is made in S14. In this case, S11 and S14 are periodically executed until the operation of the electric motor 10 is permitted. In this case, because the first position has been finally determined, S12 and S13 are not executed. When the initial check is completed and therefore the operation of the electric motor 10 is permitted, an affirmative determination is made in S14. In S15, the shift position P2 that is tentatively determined by executing the shift position determination routine is read. In S16, it is determined whether the first position P1 differs from the shift position P2 read in S15 in the current routine. When it is determined that the first position P1 and the shift position P2 read in S15 in the current routine are the same (P1=P2), a negative determination is made in S16. A determination that the shift position has not been changed is made, and therefore the second position is not finally determined. On the other hand, when the shift position P2 differs from the first position P1 (P1≠P2), an affirmative determination is made in S16. In S17, the second position P2 is finally determined, and a determination that the shift position has been changed is made. In S18, the shift position change determination flag is set. As described above, when the second position is tentatively determined before the operation of the electric motor 10 is permitted, the shift position is finally determined after the operation of the electric motor 10 is permitted. When the second position is tentatively determined at the same time that the operation of the electric motor 10 is permitted or after the operation of the electric motor 10 is permitted, it is finally determined that the tentatively determined shift position has been selected. When both the first position P1 and the second position P2 (the position that differs from the first position P1) are finally determined, a determination that the shift position has been changed is made.

Figure 10:
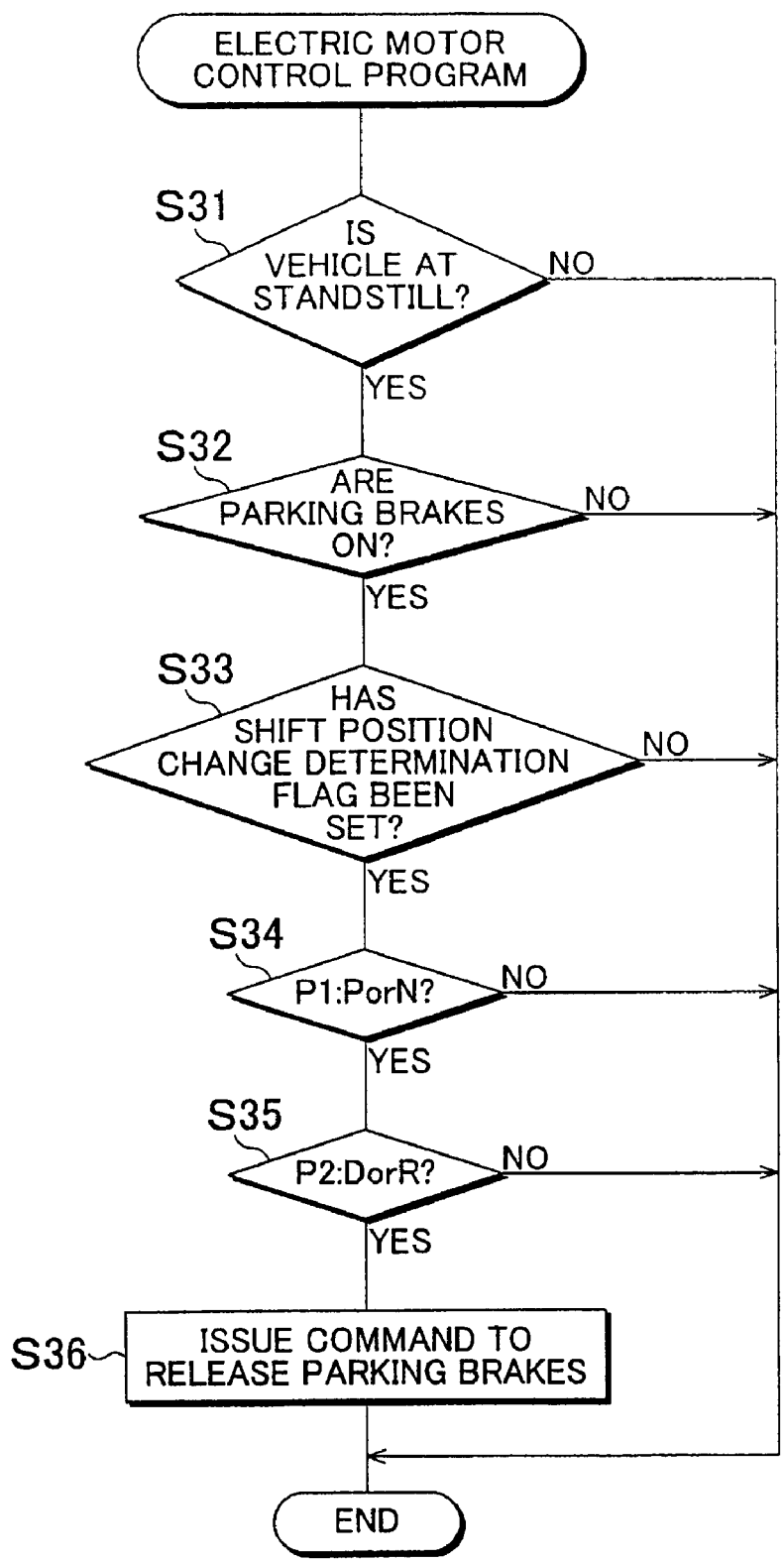
FIG. 10 is a flowchart showing the electric motor control program stored in the storage unit of the electric parking brake ECU 200.

FIG. 10 is a flowchart showing the electric motor control program. The electric motor control program is executed at predetermined time intervals. In S31, it is determined whether the vehicle is at a standstill. In S32, it is determined whether the parking brakes 18 and 20 are on. It is determined that the vehicle is at a standstill, when the vehicle is moving at a speed equal to or lower than a predetermined speed, at which the vehicle is regarded as being at a standstill, based on the information indicating the wheel speed or the information indicating the vehicle speed transmitted through the CAN 214. When it is determined that the vehicle is not at a standstill, or when it is determined that the parking brakes 18 and 20 are off, S33 and the following steps are not executed. When the vehicle is at a standstill and the parking brakes 18 and 20 are on, the shift position change determination flag, the first position P1 and the second position 2 are read and it is determined whether the shift position change determination flag has been set in S33. When it is determined that the shift position change determination flag has been set, it is determined in S34 whether the first position P1 is one of Park and Neutral (the positions at which the vehicle is at a standstill). It is determined in S35 whether the second position P2 is one of Drive and Reverse (the positions at which the vehicle is moving). Namely, it is determined whether the shift position is changed from a shift position, at which the vehicle is instructed to be at a standstill, to a position, at which the vehicle is instructed to move. When the shift position is changed from one of Park and Neutral to one of Drive and Reverse, a command to release the parking brakes 18 and 20 (a command to release the cables 22 and 24) is issued in S36. As described so far, according to the embodiment of the invention, the second position P2 is finally determined at the same time that the operation of the electric motor 10 is permitted or after the operation of the electric motor 10 is permitted and a determination that the shift position has been changed is made. Then, a command to release the parking brakes 18 and 20 is issued. Therefore, even if the shifting operation is performed before the operation of the electric motor 10 is permitted and the second position P2 is tentatively determined before the operation of the electric motor 10 is permitted, the second position P2 is finally determined at the same time that the operation of the electric motor 10 is permitted or after the operation of the electric motor 10 is permitted, and then a determination that the shift position has been changed is made. Accordingly, it is possible to relatively operate the electric motor 10 based on the determination of a change in the shift position, and to reliably execute the shift-associated release control. Even before the operation of the electric motor 10 is permitted, the first position is finally determined. Accordingly, even if the shifting operation member 230 is operated by the driver within a short time after the ignition switch 225 is turned on, it is possible to finally determine the first position. As a result, it is possible to more reliably detect a change in the shift position due to the operation of the shifting operation member 230.

After the release control is executed, the parking brakes 18 and 20 are no longer on. Therefore, a negative determination is made in S32. After the vehicle starts moving, the vehicle is no longer at a standstill. Therefore, a negative determination is made in S31. When a negative determination is made in one of S31 and S32, S33 and the following steps are not executed. When a negative determination is made in one of S34 and S35, a command to release the parking brakes 18 and 20 is not issued. For example, when the ignition switch 225 is turned on and then the shift position is changed from Park to Neutral in response to the operation of the shifting operation member 230, a negative determination is made in S35. Because it is not considered that the driver intends to start the vehicle, the release control is not executed. After this, the shifting operation for changing the shift position from Neutral to Drive or Reverse is performed in many cases. Therefore, it is finally determined in S11 to S13 in the shift position change determination program that the first position is Neutral. When the shift position is changed to Drive or Reverse while S11 and S14 to S16 are periodically executed, an affirmative determination is made in S16. Then, in S17, the second position (Driver or Reverse) is finally determined and a determination that the shift position has been changed is made. In S18, the shift position change determination flag is set. In the electric motor control program, an affirmative determination is made in each of S31, S32 and S33. When the shift position is changed from Neutral to Drive or Reverse, an affirmative determination is made in each of S34 and S35, and a release command is issued in S36. In the shift position change determination routine, the shift position change determination flag may be set for a predetermined time and reset when the predetermined time elapses. When the shift position change determination flag is reset, the information indicating the first position P1 and the second position P2 is also cleared.

With reference to the time charts in FIGS. 11 and 12, the operation of the electric parking brake system according to the embodiment of the invention will be described while comparing it with the operation of an electric parking brake system in related art. In the electric parking brake system in related art, determination of the shift position is not made during the period from when the ignition switch 225 is turned on until when the initial check is completed (from time T1 to time T4). The situation in which the shift position is finally determined in related art is shown by each of the patterns A1 to D1 (determined shift position 1) in FIG. 11 and the pattern E1 (determined shift position 1) in FIG. 12. In the electric parking brake system in related art, the tentative determination is used as the final determination, and the tentatively determined first position and second position are finally determined as they are. As shown in the pattern A (the shift position transmitted via CAN), when the shifting operation using the shifting operation member 230 is performed at or after the time, at which it is finally determined that the shift position is in Park after the initial check is completed (T6) (i.e., after the position determination time has elapsed since the initial check is completed), a determination that the shift position has been changed is made. Accordingly, the parking brakes 18 and 20 are released in response to the determination that the shift position has been changed. However, as shown in the pattern B (the shift position transmitted via CAN), when the shifting operation is performed after the initial check is completed but before it is finally determined that the shift position is in Park (before time T6), a determination that the shift position has been changed is not made. Accordingly, the parking brakes 18 and 20 are not released. As shown by the patterns C to E, when the shifting operation is performed before the initial check is completed, a determination that the shift position has been changed is not made. Accordingly, the shift-associated release control cannot be executed.

Figure 11:
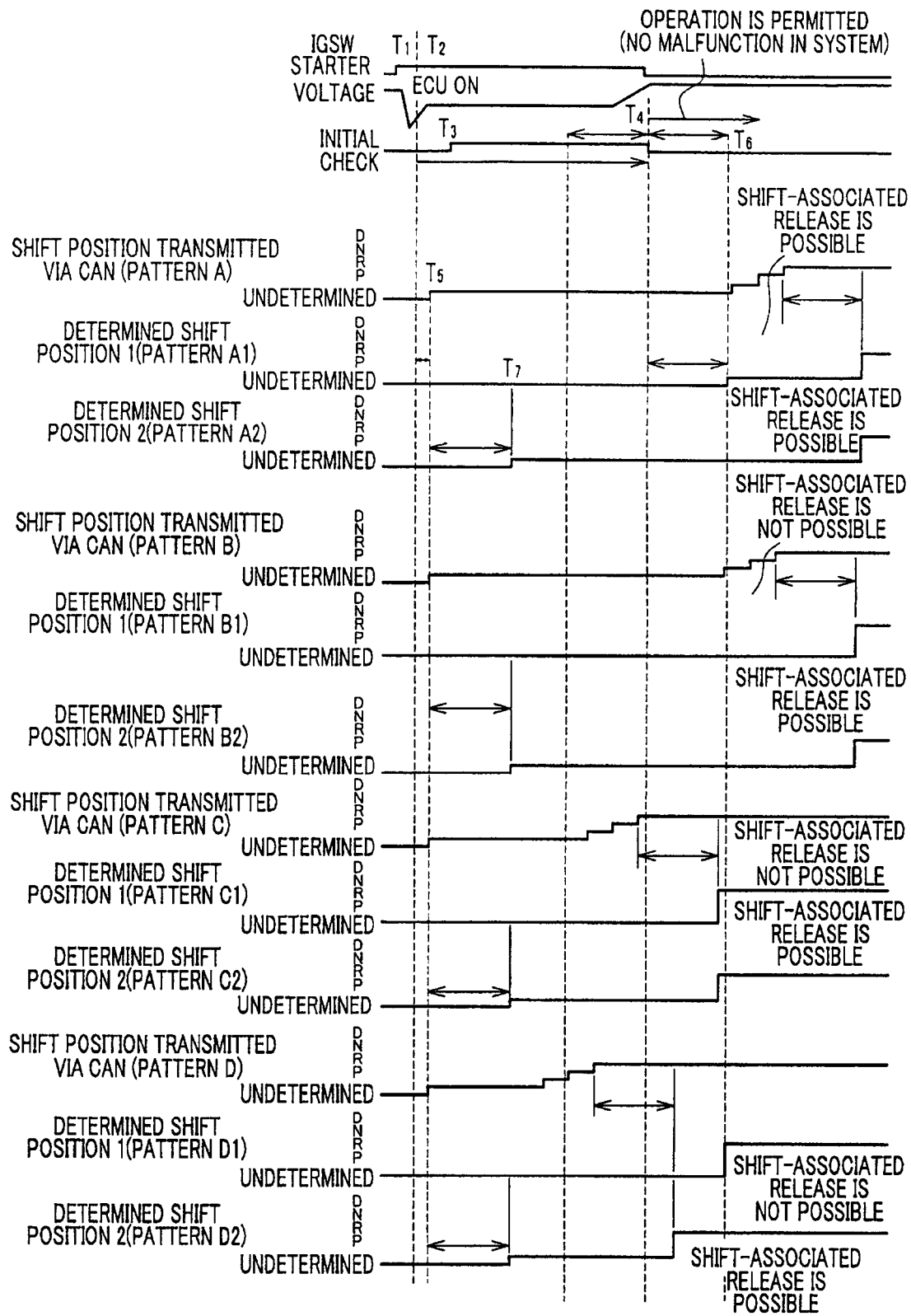
FIG. 11 is a time chart showing an operation of the electric parking brake system according to the embodiment of the invention while comparing it with an operation of an electric parking brake system in related art.
Figure 12:
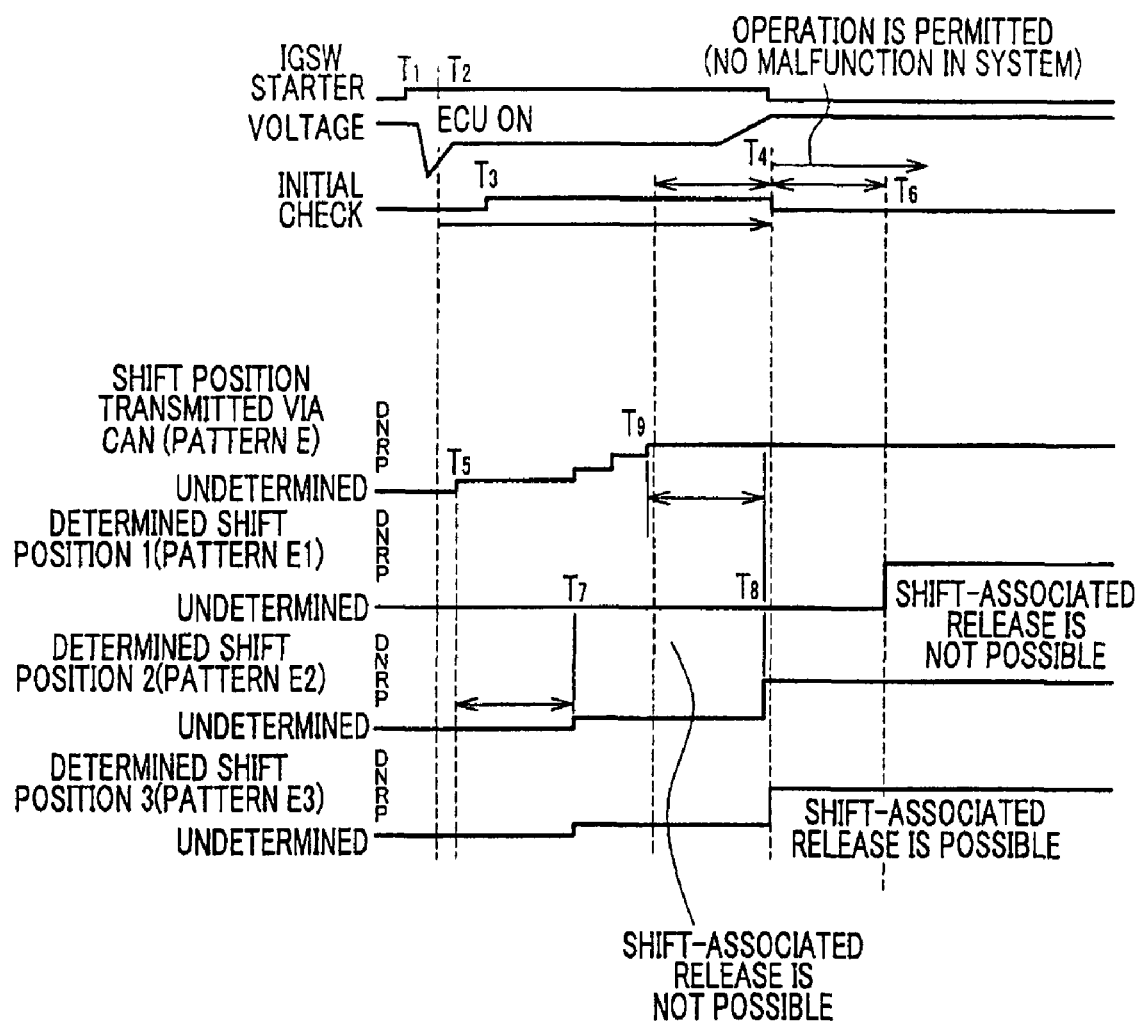
FIG. 12 is a time chart showing an operation of the electric parking brake system according to the embodiment of the invention while comparing it with an operation of the electric parking brake system in related art.

Next, the situation in which the final determination is made in the case where the determination of the shift position is made even before the initial check is completed is shown by each of the patterns A2 to D2 (determined shift position 2) in FIG. 11 and the pattern E2 (determined shift position 2) in FIG. 12. In this case as well, the tentative determination is used as the final determination, and the tentatively determined first position and second position are finally determined as they are. As shown by the patterns A2 to E2, it is possible to finally determine the first position (Park) at an early stage, that is, at time T7 which is reached when the position determination time has elapsed since the shift position determination routine is started (time T5). As a result, even when the shifting operation for changing the shift position from Park to Drive is performed before time T6 that is after the initial check is completed, as shown by pattern B, or even when the shifting operation for changing the shift position from Park to Drive is performed before the initial check is completed, as shown by each of the patterns C and D, if the second position (Drive) is finally determined after the initial check is completed, the parking brakes 18 and 20 are released in response to the final determination. However, as shown by the pattern E2, when the shifting operation using the shifting operation member 230 is performed by the driver at an earlier stage (before time T9 at which the final determination, which is completed before the initial check is completed, is started) and the second position (Drive) is finally determined before the initial check is completed, the parking brakes 18 and 20 are not released even if a release command is issued, because the operation of the electric motor 10 has been prohibited. In contrast, as shown by the pattern E3 (determined shift position 3), even when the second position is tentatively determined at time T8 that is before the initial check is completed, if the second position is finally determined at time T4 that is after the operation of the electric motor is permitted and a determination that the shift position has been changed is made, an release command is issued in response to the determination that the shift position has been changed. As a result, the parking brakes 18 and 20 are released. As described so far, even when the shifting operation is performed within a short time after the ignition switch 225 is turned on, the shift-associated release control is reliably executed.

Figure 15:
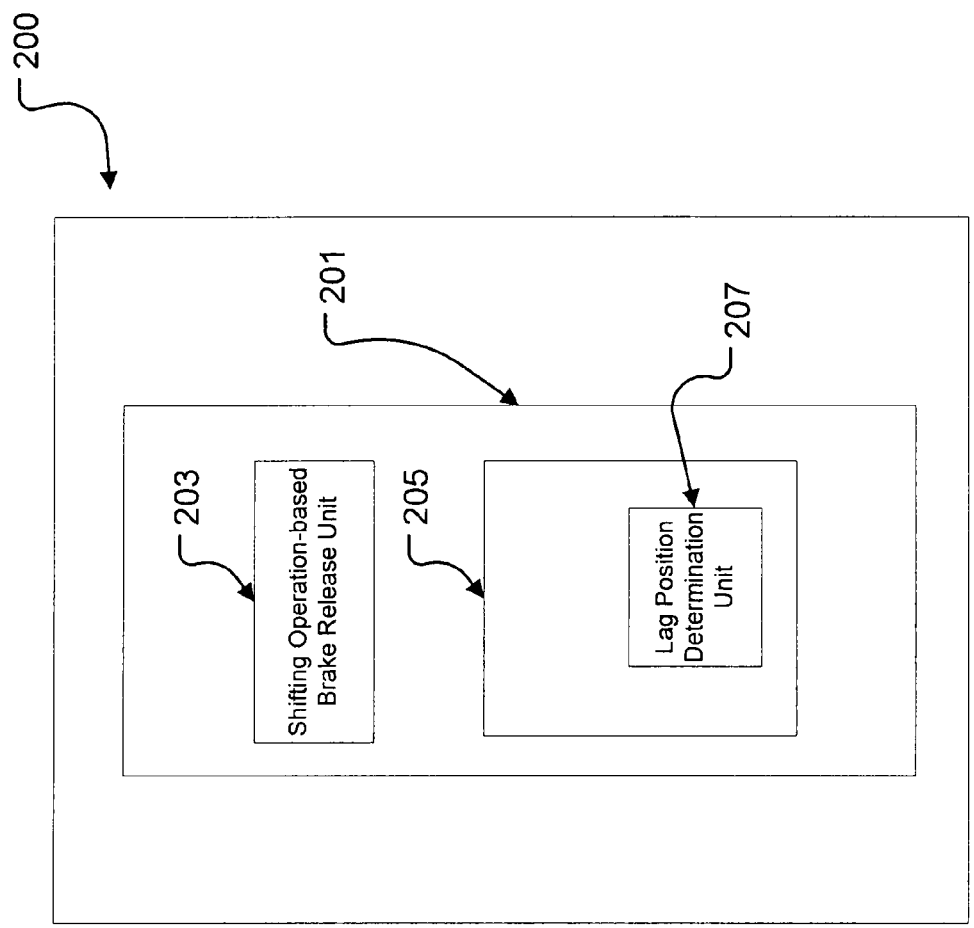
FIG. 15 is a view illustrating some components of the electric parking brake ECU.

In FIG. 15 the electric parking brake ECU 200 according to the embodiment of the invention described so far, a unit that stores the electric motor control program shown by the flowchart in FIG. 10, a unit that executes the electric motor control program, a unit that stores the shift position change determination routine shown by the flowchart in FIG. 9, a unit that executes the shift position change determination routine, a unit that stores the shift position determination routine shown by the flowchart in FIG. 8, a unit that executes the shift position determination routine, etc. constitute a brake release unit 201. The brake release unit 201 includes a shifting operation-based release unit 203, and an after-permission brake release unit 205. In the after-permission brake release unit 205, a unit that stores the shift position determination routine, a unit that executes the shift position determination routine, a unit that stores S11 to S13 in the shift position change determination routine, a unit that executes S11 to S13, etc. constitute a during-prohibition shift position determination unit. The during-prohibition shift position determination unit, a unit that stores S14 to S17 in the shift position change determination routine, a unit that executes S14 to S17, etc. constitute a lag position determination unit 207. Also, a unit that stores the shift position determination routine shown by the flowchart in FIG. 8, a unit that executes the shift position determination routine, etc. constitute a shift position determination unit.

The shift-associated release control may be executed in the case in which the parking brakes 18 and 20 are applied when the vehicle stops running, for example, at a stop signal. In this case, because the operation of the electric motor 10 has been permitted, a negative determination is not made in S14 in the shift position change determination routine. In S11 to S13, the first position is finally determined. When the second position differs from the first position, the second position is finally determined and a determination that the shift position has been changed is made in S17. Then, the shift position change determination flag is set in S18. In the electric motor control program, when the vehicle is at a standstill and the parking brakes 18 and 20 are on, an affirmative determination is made in each of S31 and S32. Because the shift position change determination flag has been set, it is determined in S34 and S35 whether the shift position has been changed from a shift position at which the vehicle is instructed to be at a standstill to a shift position at which the vehicle is instructed to move. When an affirmative determination is made in each of S34 and S35, a release command is issued. Even if the driver does not perform the release command operation using the parking switch 210, the parking brakes 18 and 20 are automatically released in accordance with the shifting operation.

In contrast, in a vehicle in which an engine can be automatically stopped/started while the vehicle is at a standstill, when the shifting operation member 230 is operated to change the shift position from a shift position, at which the vehicle is at a standstill, to a position, at which the vehicle moves, after the engine is started, the parking brakes 18 and 20 are sometimes automatically released. In the vehicle in which the engine can be automatically stopped/started, an auxiliary power supply or a converter (booster) is usually provided to prevent the situation in which the voltages in the ETC ECU 222, the PKB ECU 200, etc. are decreased and these ECUs become inoperative or the power supply voltage in an actuator, for example, the electric motor 10 is decreased and the actuator becomes inoperative, even when the engine is at a standstill. However, in a vehicle in which such auxiliary power supply or converter is not provided, the operation of the electric parking brake ECU 200 is sometimes prohibited or the operation of the electric motor 10 is sometimes prohibited when the engine is at a standstill or immediately after the engine is started. The same situation as in the case where the ignition switch 225 is turned on in the embodiment of the invention may be caused. In such a situation, executing the following control is effective. In this control, the tentative determination of the shift position is started when a predetermined time has elapsed (corresponding to time T5) since the operation of the electric parking brake ECU 200 is enabled (corresponding to time T2). At the same time that the operation of the electric motor 10 is permitted or after the operation of the electric motor 10 is permitted (at the same time that the power supply voltage is recovered or after the power supply voltage is recovered), the second position is finally determined and a determination that the shift position has been changed is made, and then a release control command for the electric motor 10 is issued. Even when the driver operates the shifting operation member 230 before the operation of the electric motor 10 is permitted, the parking brakes 18 and 20 are automatically released.

In the vehicle in which the engine can be automatically stopped/started, in the case where the brake is not released when the engine is at a standstill and before the engine is started, it is considered that the operation of the electric motor 10 is prohibited until the engine is started. In this case, the operation of the electric motor 10 is prohibited in the control.

Figure 14:
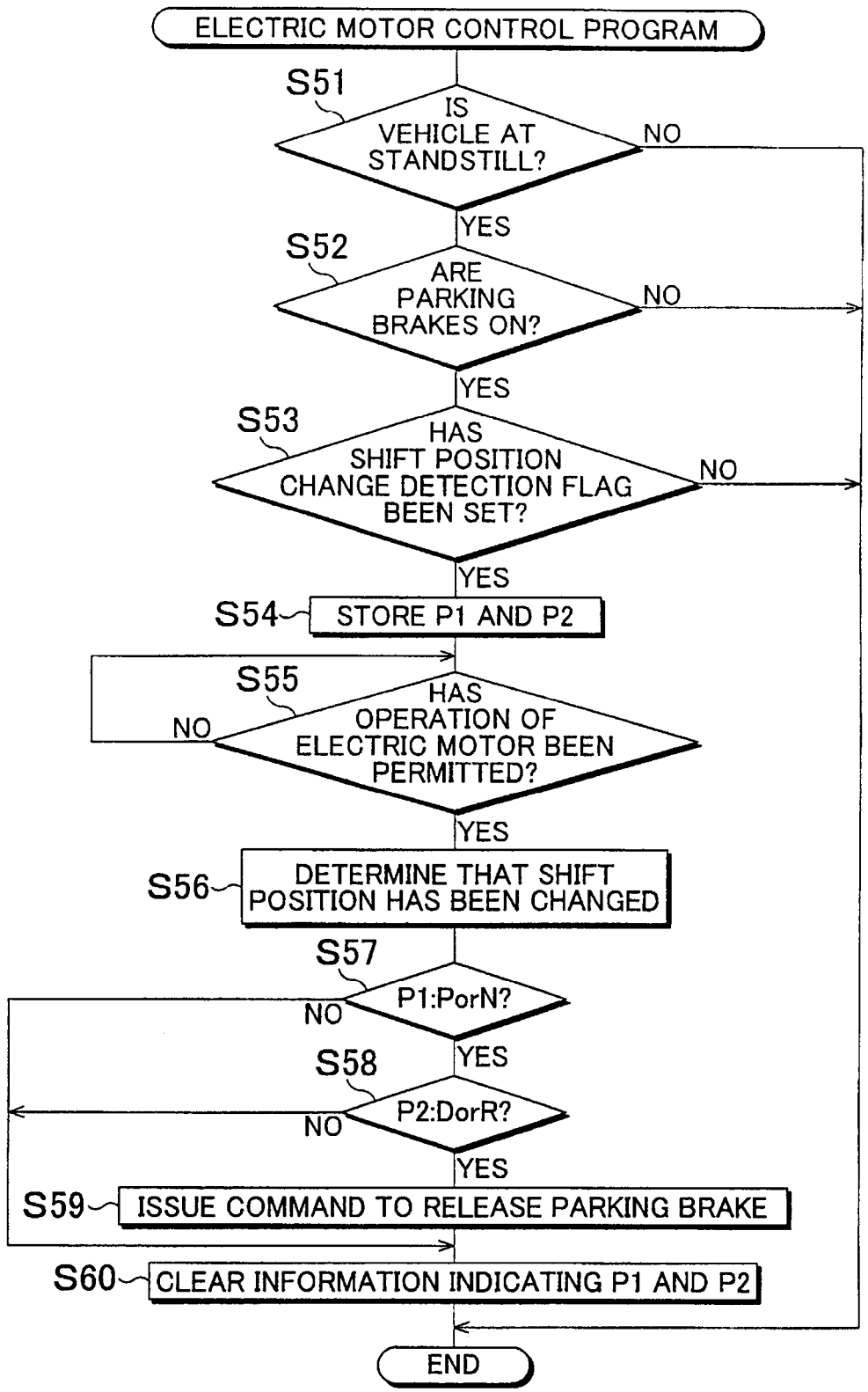
FIG. 14 is a flowchart showing the electric motor control program stored in the storage unit of the electric parking brake ECU 200.

In the embodiment of the invention described above, the second position is finally determined at the same time that the operation of the electric motor 10 is permitted or after the operation of the electric motor 10 is permitted, whereby a determination that the shift position has been changed is made at the same time that the operation of the electric motor 10 is permitted or after the operation of the electric motor 10 is permitted. Alternatively, the first position and the second position may be finally determined before the operation of the electric motor 10 is permitted, and a determination that the shift position has been changed may be made at the same time that the operation of the electric motor 10 is permitted or after the operation of the electric motor 10 is permitted. Executing the shift position detection program shown by the flowchart in FIG. 13 makes it possible to finally determine the first position and the second position and to make a determination that the shift position has been changed regardless of whether the operation of the electric motor 10 has been permitted. The shift position detection program in FIG. 13 is the same as the shift position determination program shown by the flowchart in FIG. 9 except that the shift position detection program in FIG. 13 does not include S14 in the shift position change determination routine in FIG. 9, the second position is finally determined and a determination that the shift position has been changed is made in S17' in the shift position change detection program in FIG. 13, and the shift position change detection flag is set in S18' in the shift position change detection program in FIG. 13. According to the electric motor control program shown by the flowchart in FIG. 14, when the shift change detection flag has been set, a determination that the shift position has been changed is made at the same time that the operation of the electric motor 10 is permitted or after the operation of the electric motor 10 is permitted, and a release command is issued. It is determined in S51 whether the vehicle is at a standstill and it is determined in S52 whether the parking brakes 18 and 20 are on. When an affirmative determination is made in each of S51 and S52, it is determined in S53 whether the shift position change detection flag has been set, and the first position and the second position are read and stored in S54. In S55, it is determined whether the operation of the electric motor 10 has been permitted. When it is determined that the operation of the electric motor 10 has not been permitted, S55 is periodically executed until the operation of the electric motor 10 is permitted. When it is determined that the operation of the electric motor 10 has been permitted, a determination that the shift position has been changed is made in S56, and it is determined in S57 whether the first position P1 is a shift position at which the vehicle is at a standstill and it is determined in S58 whether the second position P2 is a shift position at which the vehicle moves. When an affirmative determination is made in each of S57 and S58, a release command is issued in S59, and the information indicating the first position P1 and the second position P2 that are stored in S54 is cleared in S60. As described so far, the first position and the second position are finally determined regardless of whether the operation of the electric motor 10 has been permitted. However, a determination that the shift position has been changed is made at the same time that the operation of the electric motor 10 is permitted or after the operation of the electric motor 10 is permitted. Accordingly, as in the embodiment of the invention described above, even when the shifting operation is performed before the operation of the electric motor 10 is permitted, a determination that the shift position has been changed is made at the same time that the operation of the electric motor 10 is permitted or after the operation of the electric motor 10 is permitted. Accordingly, the parking brakes 18 and 20 are released. When a negative determination is made in one of S57 and S58, a release command is not issued. However, the information indicating the first position P1 and the second position P2 is cleared in S60. As described so far, in the electric parking brake ECU 200, a unit that stores the shift position determination routine shown by the flowchart in FIG. 8 and S11 to S17' in the shift position change detection routine shown by the flowchart in FIG. 13, a unit that executes the shift position determination routine shown by the flowchart in FIG. 8 and S11 to S17' in the shift position change detection routine, etc. constitute a shift position determination unit. A unit that stores S54 to S56 in the electric motor control program shown by the flowchart in FIG. 14, and a unit that executes S54 to S56, etc. constitute a lag change determination unit.

In addition to the shift position sensor 228, means for detecting the shift position based on the state of an automatic transmission (for example, the state of electric current supply to solenoids of multiple solenoid valves, which corresponds to the shift position) may be provided. When the vehicle is at a standstill, the position of the shifting operation member 230 usually corresponds to the state of the transmission. However, because the control over the solenoids, etc. in the transmission is executed based on the result of detection by the shift position sensor 228, the state of the transmission is changed only after the shift position sensor 228 detects a change in the shift position. Accordingly, it is appropriate to issue a command to release the parking brakes 18 and 20 after the state of the transmission is actually changed. The parking brakes 18 and 20 are released after a change in the position of the shifting operation member 230 is detected and an actual change in the state of the transmission is detected.

According to the embodiment of the invention described above, the brakes are released when the shift position is changed from Park or Neutral to Drive or Reverse. Alternatively, the brakes may be released when the shift position is changed from Park to Driver or Reverse. The structure of the electric parking brake system is not limited to that according to the embodiment of the invention. For example, the motion conversion mechanism 12 may be structured by directing winding the portion shared by the cables 22 and 24 (the portion opposite to the parking brakes with respect to the position at which the equalizer is provided) around the gear provided on the output shaft of the electric motor 10. The portion shared by the cables 22 and 24 extends along the tangential direction of the gear, and is linearly moved (pulled or slackened) in accordance with the rotation of the electric motor 10. The motion conversion mechanism may further include a plurality of gears, and may include a worm and a worm wheel. In this case, a clutch is not required. The parking brake may be a uni-servo drum brake or a disc brake. In addition, the electric motor 10 may be an ultrasonic motor. In this case, a clutch need not be provided. The invention is not limited to the embodiment described above. To the contrary, the invention is intended to cover various modifications and equivalent arrangements made based on the knowledge of those who are skilled in the art.

What is claimed is:

1. An electric parking brake system, comprising:
   a brake that is fitted to a wheel and that includes a rotating body which has a friction face and which rotates together with the wheel, a friction member which is fitted to a non-rotating body so as to be movable relative to the non-rotating body, and a pushing mechanism that pushes the friction member against the friction face of the rotating body;
   an electric motor;
   a motion conversion mechanism that converts a rotation of a rotating shaft of the electric motor into a linear motion of an output member of the motion conversion mechanism;
   a connection unit that is connected at one end to the output member of the motion conversion mechanism, and that is connected at an other end to the pushing mechanism;
   a clutch that maintains a force with which the friction member is pushed against the friction face in the brake, when electric current is not supplied to the electric motor;
   a shifting operation member that is moved in response to an operation performed by a driver, and that is held at a position to which the shifting operation member has been moved;
   a shift position sensor that detects a shift position which is the position of the shifting operation member; and
   a brake release unit that releases the brake by operating the electric motor based on a change in a position of the shifting operation member,
   wherein an operation of the electric motor is prohibited for at least a period from when an ignition switch of a vehicle is turned on until when an initial check is completed, and
   wherein the brake release unit includes
   a lag position determination unit, such that while the operation of the of the electric motor is prohibited, when the shift position detected by the shift position sensor is continuously the same for a predetermined time or longer, the lag position determination unit determines that the shift position detected by the shift position sensor is a first shift position and stores the shift position as the first shift position, and when the shift position detected by the shift position sensor is continuously the same for the predetermined time or longer and different from the first shift position, the lag position determination unit determines, at the same time that the operation of the electric motor is permitted or after the operation of the electric motor is permitted, that the shift position is a second shift position, stores the shift position as a second shift position, and makes a determination that the shift position has been changed, and
   an after-permission brake release unit that releases the brake when the lag position determination unit determines that the shift position has been changed, that the first position is a shift position at which the vehicle is at a standstill, and that the second shift position is a shift position at which the vehicle moves.

2. The electric parking brake system according to claim 1, further comprising:
   a shift position determination unit that stores, when the shift position detected by the shift position sensor is continuously the same for the predetermined time or longer, the shift position and that determines that the shift position has been selected,
   wherein the brake release unit further includes a lag change determination unit that makes a determination, at the same time that the operation of the electric motor is permitted or after the operation of the electric motor is permitted, that the shift position has been changed, when the shift position determination unit determines both the first shift position and the second shift position, which differs from the first shift position, while the operation of the electric motor is prohibited, and
   wherein the after-permission brake release unit releases the brake when the lag change determination unit determines that the shift position has been changed and that the first shift position is a shift position at which the vehicle is at a standstill and the second position is a shift position at which the vehicle moves.

3. The electric parking brake system according to claim 2, wherein,
   the connection unit is a cable;
   the pushing mechanism pushes the friction member against the friction face when the cable is pulled due to the operation of the electric motor; and
   the electric parking brake system includes a tension sensor that detects a tension of the cable and a unit that carries out checks including a check as to whether the tension sensor operates properly as the initial check.

4. The electric parking brake system according to claim 1, wherein,
the connection unit is a cable;
the pushing mechanism pushes the friction member against the friction face when the cable is pulled due to the operation of the electric motor; and
the electric parking brake system includes a tension sensor that detects a tension of the cable and a unit that carries out checks including a check as to whether the tension sensor operates properly as the initial check.

5. The electric parking brake system according to claim 1, wherein the operation of the electric motor is sometimes prohibited when an engine of the vehicle is at a standstill or immediately after the engine is started.

* * * * *